United States Patent
Sahlin et al.

(10) Patent No.: US 10,285,195 B2
(45) Date of Patent: May 7, 2019

(54) PROCESSING OF RANDOM ACCESS PREAMBLE SEQUENCES

(71) Applicant: Telefonaktiebolaget L M Ericsson (publ), Stockholm (SE)

(72) Inventors: Henrik Sahlin, Molnlycke (SE); Stefan Parkvall, Bromma (SE); Peter Nauclér, Knivsta (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 220 days.

(21) Appl. No.: 14/366,324

(22) PCT Filed: Jun. 11, 2014

(86) PCT No.: PCT/EP2014/062169
§ 371 (c)(1),
(2) Date: Jun. 18, 2014

(87) PCT Pub. No.: WO2015/188861
PCT Pub. Date: Dec. 17, 2015

(65) Prior Publication Data
US 2015/0365975 A1    Dec. 17, 2015

(51) Int. Cl.
*H04W 74/00*    (2009.01)
*H04L 27/26*    (2006.01)

(52) U.S. Cl.
CPC ....... *H04W 74/004* (2013.01); *H04L 27/2613* (2013.01); *H04L 27/2663* (2013.01); *H04L 27/2628* (2013.01)

(58) Field of Classification Search
None
See application file for complete search history.

(56) References Cited

U.S. PATENT DOCUMENTS

| | | | |
|---|---|---|---|
| 8,798,221 B1 * | 8/2014 | Marsh | H04L 27/2662 375/365 |
| 2004/0264561 A1 * | 12/2004 | Alexander | H04L 25/0204 375/232 |

(Continued)

FOREIGN PATENT DOCUMENTS

WO    2007149290 A2    12/2007

OTHER PUBLICATIONS

Lee, J. et al., "Rapid cell search in OFDM-based cellular systems", 2005 IEEE 61st Vehicular Technology Conference, VTC2005, Spring, May 30-Jun. 1, 2005, Stockholm, Sweden, IEEE, Piscataway, NJ, USA, vol. 2, May 30, 2005, pp. 1273-1277, XP010855616.

*Primary Examiner* — Jeffrey M Rutkowski
*Assistant Examiner* — Andre G Tacdiran
(74) *Attorney, Agent, or Firm* — Rothwell, Figg, Ernst & Manbeck, p.c.

(57) ABSTRACT

The present disclosure relates to random access in wireless communication systems, and in particular to a wireless device, a preamble receiver, and methods for processing random access preamble signals. A disclosed method in a wireless device comprises generating (S11) one or more identical short sequences having a same time duration as an OFDM symbol used for carrying data traffic in a radio access network of the wireless device. The method also comprises generating (S12) at least one offset indicator sequence different from each of the short sequences, and constructing (S13) the preamble sequence by concatenating the at least one offset indicator sequence and the one or more identical short sequences in time, such that each of the at least one offset indicator sequence has a respective pre-determined location in the preamble sequence.

12 Claims, 18 Drawing Sheets

(56) References Cited

U.S. PATENT DOCUMENTS

| | | | | |
|---|---|---|---|---|
| 2007/0291696 A1* | 12/2007 | Zhang | H04L 5/023 | 370/331 |
| 2008/0165892 A1* | 7/2008 | Yang | H04L 27/2647 | 375/299 |
| 2009/0219856 A1* | 9/2009 | Richardson | H04W 72/044 | 370/328 |
| 2010/0172423 A1* | 7/2010 | Chrabieh | H04L 27/2613 | 375/260 |
| 2010/0239034 A1* | 9/2010 | Lee | H04L 5/0053 | 375/260 |
| 2010/0309853 A1* | 12/2010 | Richardson | H04L 27/261 | 370/329 |
| 2011/0149943 A1* | 6/2011 | Srinivasan | H04L 25/0212 | 370/343 |
| 2011/0158342 A1* | 6/2011 | Srinivasan | H04L 25/0212 | 375/285 |
| 2012/0027147 A1* | 2/2012 | Ray | H04L 27/2647 | 375/359 |
| 2012/0063294 A1* | 3/2012 | Osterling | H04L 27/2665 | 370/210 |
| 2012/0134288 A1* | 5/2012 | Fang | G01S 5/0205 | 370/252 |
| 2013/0021977 A1* | 1/2013 | Yang | H04L 27/2659 | 370/328 |
| 2013/0315342 A1* | 11/2013 | Um | H04L 27/2613 | 375/295 |
| 2013/0343468 A1* | 12/2013 | Ko | H04H 20/42 | 375/240.25 |
| 2014/0226738 A1* | 8/2014 | Plevel, Sr. | H04L 25/063 | 375/261 |
| 2014/0254515 A1* | 9/2014 | Kim | H04W 74/0833 | 370/329 |
| 2014/0376432 A1* | 12/2014 | Smith | H04W 52/0206 | 370/311 |
| 2014/0376495 A1* | 12/2014 | Noh | H04W 74/004 | 370/329 |
| 2015/0071375 A1* | 3/2015 | Kwon | H04L 27/2628 | 375/295 |

* cited by examiner

PROCESSING OF RANDOM ACCESS PREAMBLE SEQUENCES

CROSS-REFERENCE TO RELATED APPLICATION

This application is a 35 U.S.C. § 371 National Phase Entry Application from PCT/EP2014/062169, filed Jun. 11, 2014, and designating the United States.

TECHNICAL FIELD

The present disclosure relates to random access in wireless communication systems, and in particular to a wireless device, a preamble receiver, and methods for processing random access preamble sequences.

BACKGROUND

The fourth generation, 4G, wireless access within the 3rd generation partnership project, 3GPP, long-term evolution, LTE, is based on orthogonal frequency-division multiplexing, OFDM, in downlink and discrete Fourier transform, DFT, spread OFDM, also known as single carrier frequency division multiple access, SC-FDMA, in uplink. Here, with reference to FIG. 2, the uplink consists of the physical channels physical uplink shared channel, PUSCH, physical uplink control channel, PUCCH, and physical random access channel, PRACH, as well as of physical signals referred to as the demodulation reference signal, DMRS, and the sounding reference signal, SRS. According to the 3GPP specification, see 3GPP TS 36.211 V11.3.0, the PUSCH, PUCCH, DMRS, and SRS all use an inverse fast Fourier transform, IFFT, of size 2048 in the transmitter, with a sampling rate of 30.72 MHz, see FIG. 2. The same size of 2048 can be used for the fast Fourier transform, FFT, in the receiver. Dedicated hardware is commonly used for these FFTs. With another sampling rate than 30.72 MHz, the IFFT and FFT size will change accordingly.

The physical random-access channel, i.e., the PRACH, is used for initial access for a wireless device into the radio access network and also for timing offset estimation, i.e., estimation of timing offset between wireless device transmissions and reception at, e.g., a base station or other receiver in the radio access network. A description of this random access procedure is given in 3GPP TS 36.213, V11.3.0. The PRACH formats, as specified for LTE, see, e.g., 3GPP TS 36.211, V11.3.0, comprise five different formats where a PRACH preamble consists of one or two sequences, each of length 24 576 samples. The preambles of some formats have a cyclic prefix, CP, of length between 3 168 and 21 024 samples, as shown in FIG. 2.

Several methods have been proposed for how to detect the PRACH preambles transmitted by the wireless device, see e.g., S. Sesia. I. Toufik. M Baker "LTE, The UMTS Long Term Evolution, From Theory to Practice", Second Edition, John Wiley & Sons Ltd., 2011.

Many of the proposed preamble detection methods have in common that they require a large FFT, often significantly larger than the FFT used to detect OFDM symbols transmitted, e.g., on the PUSCH, as illustrated in FIG. 2. This large FFT drives complexity and power consumption in many systems, and potentially also increases the need for cooling of the receiver.

Implementing methods that require a large FFT can be especially burdensome in emerging fifth generation, 5G, technologies, where the use of very many antenna elements is foreseen. This is because the large FFT must typically be determined for each separate antenna, or subset of antennas, such that different users and channels in different sub-bands of the received signal can be extracted before further signal processing.

Furthermore, the PRACH preamble as specified in LTE, see table 5.7.1-1, section 5.7.1 in 3GPP TS 36.211, V11.3.0, covers a time interval which is much longer than the length of OFDM symbols used for other transmissions such as user data symbols. Current PRACH preamble receivers are thus designed under the assumption that propagation conditions do not vary significantly during the length of the preamble. This may be problematic, since assumptions, or constraints, are placed on the communication system. These constraints include expectations on low wireless device speed, i.e., Doppler spread, low frequency errors and low Doppler shifts, and also low phase noise in transmitters and receivers.

Thus, there is a need for an improved random access signaling technique, i.e., a preamble sequence transmitter and receiver, which does not place or otherwise imply the above mentioned constraints on the communication system, and which allows for both reliable and efficient random access detection as well as accurate timing offset estimation of a received random access signal, in small cells as well as in large cells.

SUMMARY

An object of the present disclosure is to provide at least a wireless device, a preamble receiver, and methods for processing random access preamble signals which seek to mitigate, alleviate, or eliminate one or more of the above-identified deficiencies in the art and disadvantages singly or in any combination.

This object is obtained by a method in a wireless device for processing a preamble sequence. The method comprises generating one or more identical short sequences. Each of the short sequences has a same time duration as an orthogonal frequency division multiplexing, OFDM, symbol used for carrying data traffic in a radio access network of the wireless device. The method also comprises generating at least one offset indicator sequence different from each of the short sequences, and constructing the preamble sequence by concatenating the at least one offset indicator sequence and the one or more identical short sequences in time, such that each of the at least one offset indicator sequence has a respective pre-determined location in the preamble sequence.

By the present technique, the same size FFT implementation can be used both for processing 'regular' OFDM symbols carrying, e.g., data traffic, and for processing random access preamble sequences. Thus, there is no longer a need for use of a special dedicated FFT for receiving preamble sequences.

Furthermore, the present teaching allows for resolving ambiguity when estimating arrival time at a receiver of a preamble sequence comprising the one or more short sequences. Because of this, the present technique is applicable in scenarios where propagation delay can exceed a time duration T of the short sequence.

Consequently, a preamble sequence format is proposed herein which supports arrival time estimation in large cells, i.e., in cells where signal propagation delays can exceed the time duration T of the short sequence. The proposed preamble sequence format allows for both reliable and efficient random access as well as for accurate timing offset estimation in small cells as well as in large cells.

According to some aspects, one or more of the at least one offset indicator sequence has a zero amplitude. The preamble sequence consequently has at least one respective empty interval at the pre-determined location.

This empty interval at a pre-determined location enables a preamble receiver to operate in large cells, where propagation delay can exceed the time duration of the short sequence, in an efficient manner, e.g., by determining received energy at different arrival times in a preamble receiver and thus determining an approximate location of the empty interval, which approximate location can then be used to resolve the above-mentioned arrival time ambiguity.

According to some other aspects, the preamble sequence comprises a first offset indicator sequence having a respective first pre-determined location at an end of the preamble sequence.

According to some further aspects, the preamble sequence comprises a second offset indicator sequence having a respective second pre-determined location in the preamble sequence such that there is at least one short sequence located before, and at least one other short sequence located after, the second offset indicator sequence in the preamble sequence.

Thus, the preamble sequence formats disclosed herein comprise sequences with one or more offset indicator sequences, located at the end of the preamble sequence and/or elsewhere in the preamble sequence.

Aspects of the present teaching comprising use of more than one offset indicator sequence in the preamble sequence brings an additional advantage of improved detection performance of the offset indicator sequence, and thus an improvement in the capability of a receiver to resolve the above-mentioned arrival time ambiguity.

The object is also obtained by a method in a preamble receiver for processing a preamble sequence comprising one or more identical short sequences and at least one offset indicator sequence. The at least one offset indicator sequence being different from each of the short sequences and located at a respective pre-determined location in the preamble sequence. The method comprises determining a first arrival time component as an arrival time of the preamble sequence up to an unknown integer multiple of a time duration T of the short sequence, based on Fast Fourier Transform, FFT, processing of a received radio signal, wherein a size of the FFT equals a size of an FFT used for detecting an OFDM symbol carrying data traffic in a radio access network of the preamble receiver. The method also comprises determining a second arrival time component as an arrival time of the preamble sequence in terms of an integer multiple of the time duration T of the short sequence, based on the at least one offset indicator sequence. The method further comprises estimating an arrival time of the preamble sequence based on a sum of the first and the second arrival time component.

The arrival time estimate given by the first arrival time component only reflects arrival time up to an unknown integer multiple of the time duration T of the short sequence and is therefore ambiguous.

However, since the method also comprises determining a second arrival time component as an arrival time of the preamble sequence in terms of an integer multiple of the time duration of the short sequence, based on the at least one offset indicator sequence, the ambiguity can be resolved based on the first and second arrival time components to obtain a non-ambiguous arrival time estimate. In this way, arrival time estimation of the preamble sequence is possible even in large cells with propagation delays that can exceed the time duration T of the short sequence.

Consequently, there is provided herein a preamble receiver arranged to receive a preamble sequence of the present disclosure, which allows for both reliable and efficient random access as well as accurate timing offset estimation of e.g., a received PRACH signal, in small cells as well as in large cells.

There is further provided herein a wireless device arranged to process a preamble sequence. The wireless device comprises a short sequence generator unit arranged to generate one or more identical short sequences. Each of the short sequences has the same time duration as an OFDM symbol used for carrying data traffic in a radio access network of the wireless device. The wireless device also comprises an offset indicator sequence generator unit arranged to generate at least one offset indicator sequence different from each of the short sequences, as well as a preamble sequence constructor unit arranged to construct the preamble sequence by concatenating the at least one offset indicator sequence and the one or more identical short sequences in time, such that each of the at least one offset indicator sequence has a respective pre-determined location in the preamble sequence.

There is further disclosed a preamble receiver arranged to process a preamble sequence comprising one or more identical short sequences and at least one offset indicator sequence. The at least one offset indicator sequence has a respective pre-determined location in the preamble sequence, as well as being different from each of the short sequences. The preamble receiver comprises a short sequence processing unit arranged to determine a first arrival time component as an arrival time of the preamble sequence up to an unknown integer multiple of the time duration of the short sequence, based on Fast Fourier Transform, FFT, processing of the one or more identical short sequences, wherein a size of the FFT equals a size of an FFT used for detecting an OFDM symbol carrying data traffic in a radio access network of the preamble receiver. The preamble receiver also comprises a preamble sequence offset detector arranged to determine a second arrival time component as an arrival time of the preamble sequence in terms of an integer multiple of the time duration of the short sequence, based on processing of the at least one offset indicator sequence. The preamble receiver further comprises an arrival time estimator unit arranged to estimate the arrival time of the preamble sequence based on the sum of the first and the second arrival time components.

According to aspects, the preamble receiver is configured to process the preamble sequence using a number F of FFT windows arranged sequentially in time over a receiver time span and indexed by a variable f from 0 through F−1, wherein a first offset indicator sequence has zero amplitude and a respective pre-determined location at an end of the preamble sequence. The preamble sequence offset detector comprises a first late arrival detector which is arranged to determine a value of a first metric indicating the presence of a short sequence at the end of said receiver time span by an FFT window having index f=F−1. This preamble sequence offset detector is arranged to determine the second arrival time component as zero in case the value of the first metric is lower than a detection threshold, and to determine the second arrival time component as one short sequence time duration T in case the value of the first metric is higher than the detection threshold.

In this way, the arrival time ambiguity discussed above is resolved up to at least two times the time duration T of the short sequence in an efficient manner by the preamble sequence offset detector.

According to some other aspects, the short sequence processing unit further comprises an early arrival detector arranged to determine a value of a second metric indicating the presence of a short sequence at a beginning of the receiver time span by FFT processing of an FFT window having index f=0, wherein the detection threshold is set to equal the value of the second metric.

Thus, reliability and performance of the preamble sequence offset detector in resolving the above-mentioned arrival time ambiguity is further improved, due to the dynamic setting of the detection threshold to equal the value of the second metric.

According to some further aspects, the preamble receiver comprises a number D of late arrival detectors indexed by a variable d from 1 through D, wherein each of the D late arrival detectors is arranged to determine a respective metric value indicating a presence of the short sequence at a respective FFT window with an index f=F−d. The preamble sequence offset detector is then arranged to determine the arrival time of the preamble sequence based on comparison between the respective metric values determined by the plurality of late arrival detectors with respect to the detection threshold.

In this way, by setting the number D of late arrival detectors according to a maximum possible propagation delay in relation to the time duration of the short sequence, arrival time ambiguity can be resolved for arbitrarily large propagation delays. The preamble receiver can thus estimate arrival time in arbitrarily large cells as long as D is chosen according to cell size and time duration of the short sequence.

There is also disclosed herein a network node comprising a communication interface and the preamble receiver of the present teaching, as well as a preamble transmitter and receiver system, comprising at least one wireless device and at least one preamble receiver of the present disclosure.

There is further provided herein computer programs comprising computer program code which, when executed in a preamble receiver or wireless device, causes the preamble receiver or wireless device to execute a method according to aspects disclosed herein.

The computer programs, the preamble receivers, and the wireless devices furthermore display advantages corresponding to the advantages already described in relation to the methods.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Figure 1:
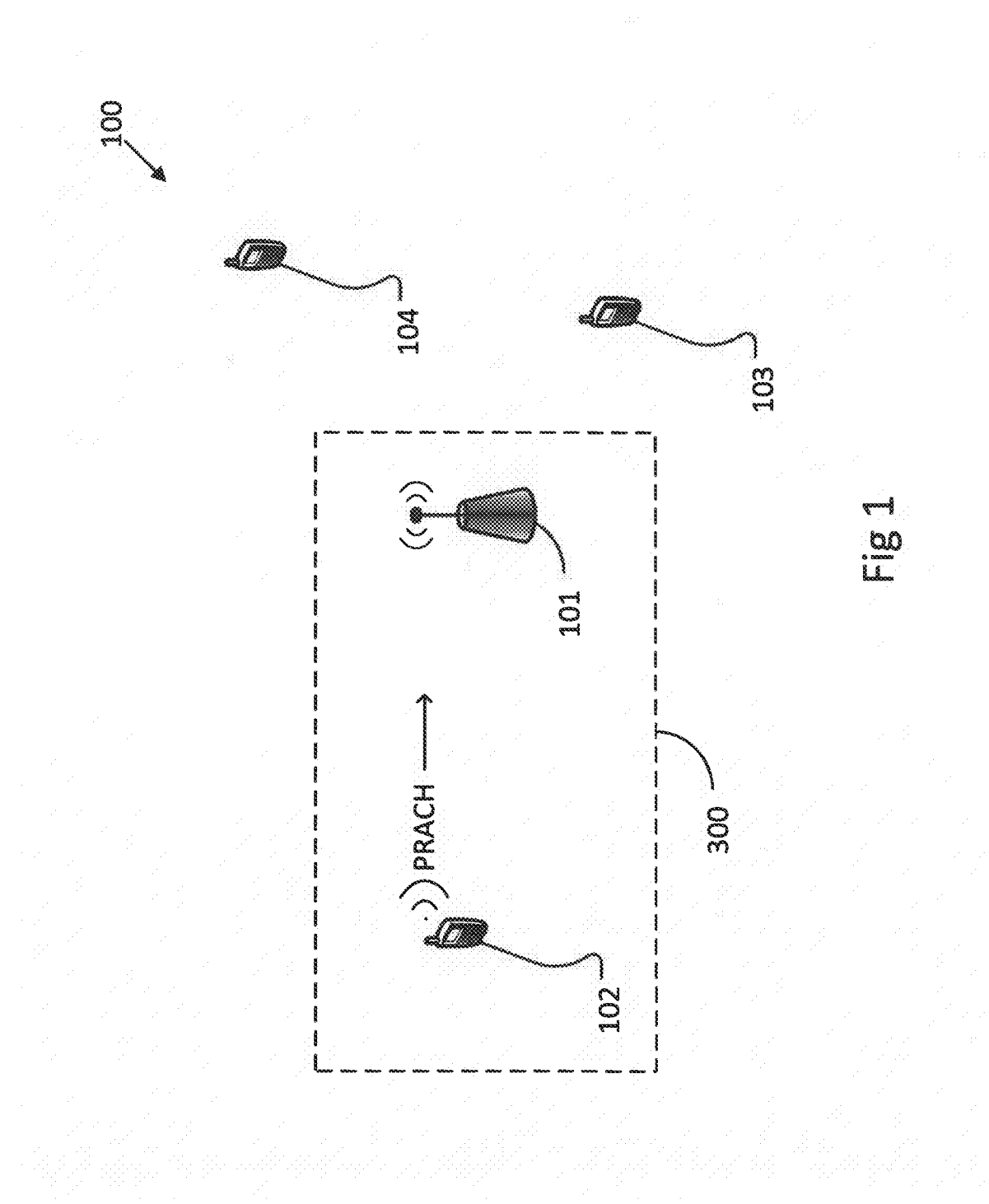
FIG. 1 is a schematic overview of a radio access network.

Aspects of the present disclosure will be described more fully hereinafter with reference to the accompanying drawings. The devices, computer programs and methods disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

ABBREVIATIONS

3GPP 3rd Generation Partnership Project
4G Fourth Generation
5G Fifth Generation
DFT Discrete Fourier Transform
DL Downlink
DMRS Demodulation reference signal
FDD Frequency Division Duplex
FFT Fast Fourier Transform
IDFT Inverse Discrete Fourier Transform
IFFT Inverse Fast Fourier Transform
LTE Long Term Evolution
MF Matched Filter
OFDM Orthogonal frequency-division multiplexing
PBCH Physical broadcast channel
PRACH Physical random access channel
PRB Physical Resource Block
PSS Primary Synchronization Signal
PUCCH Physical uplink control channel
PUSCH Physical uplink shared channel
SC Sub-Carrier
SC-FDMA Single Carrier—Frequency Division Multiple Access
SNR Signal to Noise Ratio
SRS Sounding Reference Signal
SSS Secondary Synchronization Signal
TDD Time Division Duplex
UE User Equipment
UL Uplink
ZC Zadoff-Chu

System Overview and Introduction

FIG. 1 shows a radio access network 100 with wireless devices 102, 103, 104 and a network node 101 comprising a preamble receiver. One of the wireless devices 102 is performing random access to the network node 101, which comprises generating and transmitting a preamble sequence to the network node 101, which preamble sequence is received by the preamble receiver in the network node 101.

In case of an LTE based radio access network 100, the random access is performed over the PRACH. Random access in LTE and other radio technologies is used both to facilitate initial access for a wireless device 102 into a radio access network 100 and also for timing offset estimation between wireless device 102 transmissions and reception at the network node 101.

Figure 2:
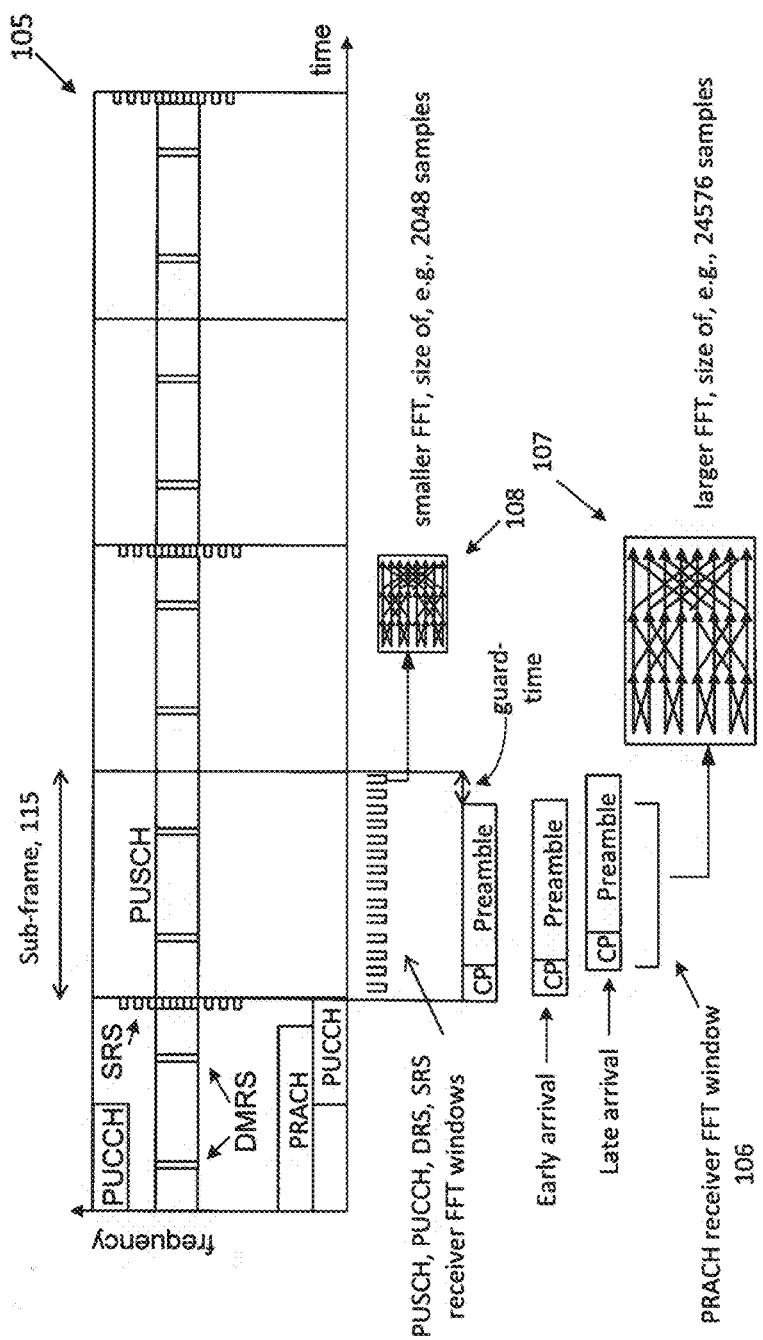
FIG. 2 illustrates signaling in a radio access network according to prior art.

FIG. 2 illustrates signaling in a radio access network such as the radio access network 100 shown in FIG. 1, according to prior art. When a wireless device, such as the wireless device 102 shown in FIG. 1, uses the PRACH, it transmits a so-called random-access preamble sequence, or preamble sequence for short, in a known time/frequency resource in the OFDM grid 105. An illustration of a PRACH receiver FFT window 106 is shown in FIG. 2. The FFT 107 used for processing PRACH is, as noted above, often larger than the FFT 108 used to process other OFDM symbols. This large FFT 107 drives complexity and power consumption in many systems, and potentially also increases the need for cooling of the preamble receiver.

Implementing methods that require a large FFT can be especially burdensome in emerging fifth generation 5G technologies, where the use of very many antenna elements is foreseen. This is because the large FFT 107 must typically be determined for each separate antenna, or subset of antennas, such that different users and channels in different sub-bands of the received signal can be extracted before further signal processing.

Further, the PRACH preamble as specified in LTE covers a time interval which is much longer than the length of OFDM symbols used for other transmissions such as user data symbols. Current PRACH preamble receivers are thus designed under the assumption that propagation conditions are not varying significantly during the length of the preamble. This may be problematic, since assumptions, or constraints, are placed on the communication system as a consequence of this assumption. These constraints include, e.g., expectations on low wireless device speed, i.e., Doppler spread, low frequency errors and low Doppler shifts, and also low phase noise in transmitters and receivers.

Figure 3:
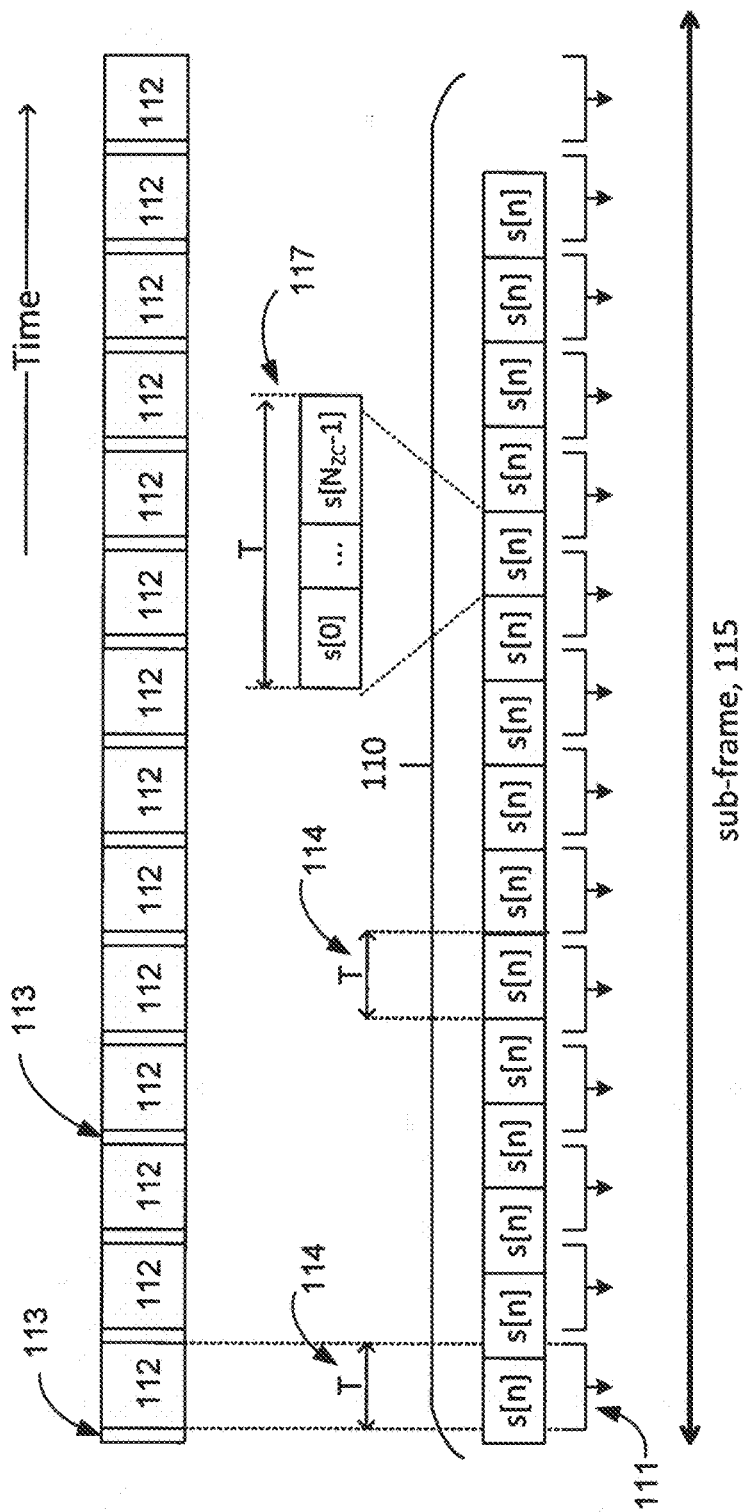
FIG. 3 schematically illustrates a preamble sequence for random access.

In order to avoid using this large dedicated FFT to detect preamble sequences, it is proposed herein, as illustrated in FIG. 3, to generate a short sequence s[n] having the same length T 114 as the length of the 'regular' OFDM symbols 112 that are used for other physical channels, such as user, control data, and reference signals. A preamble sequence 110 can then be constructed by repeating the short sequence s[n] a number of times such that the resulting preamble sequence 110 is at least as long as the time span of the desired number of FFT windows of the receiver used for detecting the preamble sequence, plus a maximum propagation delay of the radio access network.

In this way, the dedicated large preamble FFT is avoided. However, an inconvenience of using a preamble sequence constructed from identical short sequences s[n] in a repetitive pattern is that the arrival time estimate of the preamble sequence becomes ambiguous in some cases where the propagation delays can be expected to be large, i.e., in excess of the time duration T of the short sequence s[n]. This is because the repetition of short sequences limits the possibility of some arrival time estimators of estimating arrival time up to the time duration of the short sequence, which will be further discussed in connection to FIG. 5 below.

Because of this time ambiguity inconvenience, preamble sequence formats and corresponding detectors are proposed herein in which an arrival time larger than the length of the short sequence s[n] can be estimated. These preamble sequence formats are based upon a special symbol comprised in the preamble sequence, an offset indicator sequence, which enables a preamble receiver to resolve the above-mentioned arrival time ambiguity and thus reliably estimate arrival time in cells having propagation delays that can exceed the time duration T of the short sequence s[n].

The offset indicator sequence, according to aspects, is referred to as an offset indicator symbol, the two terms offset indicator symbol and offset indicator sequence being equivalent herein.

Generation of Preamble Sequences

Methods for generating the proposed preamble sequences will now be described in detail. The preamble sequence 110 discussed herein can be used for a variety of purposes, including but not limited to initial access, handover, scheduling requests, and resynchronization.

Turning again to FIG. 3, a preamble sequence 110, or preamble format, is proposed herein in which FFT windows 111 of the same size as used for other uplink channels, e.g., PUSCH, and reference signals, e.g., DMRS, SRS, can be used during detection of the preamble. Thus, no special FFT window needs to be implemented in order to detect the preamble sequence.

The proposed preamble sequence 110 is based on several concatenated short sequences, s[n], which generation will be further discussed below. Each short sequence has the same length T 114 as the length of the OFDM symbols 112 used for all other physical channels, not counting the cyclic prefixes 113.

The preamble sequence is constructed by repeating the short sequence s[n] a pre-determined number of times in one or more sub-frames 115. Consequently, the short sequence s[n] used to construct the preamble sequence works as a cyclic prefix to its neighbors, as will be further detailed below.

According to some aspects, the short sequence is constructed by using Zadoff-Chu sequences. The Zadoff-Chu sequences are a special instance of the more general class of constant amplitude—zero autocorrelation, CAZAC, sequences. Thus, according to another aspect, the short sequence s[n] is a CAZAC sequence. The short sequence can also be made up in some other fashion; the main property being that is has equal length as the 'regular' OFDM symbols 112 of the system.

The $u^{th}$ root Zadoff-Chu sequence is defined in 3GPP TS 36.211 V11.3.0 as $$x_u(n) = e^{-j\frac{\pi u n(n+1)}{N_{ZC}}}, 0 \le n \le N_{ZC} - 1 \quad (1)$$

where the length $N_{ZC}$ of the Zadoff-Chu sequence is a prime number. In LTE, for a PRACH allocation of 72 sub-carriers, the sequence length can, e.g., be set to 71. A time-continuous short random-access signal s(t) is defined by $$s_{short}(t) = \beta_{PRACH} \sum_{k=0}^{N_{ZC}-1} \sum_{n=0}^{N_{ZC}-1} x_u(n)e^{-j\frac{2\pi nk}{N_{zc}}} \cdot e^{j2\pi(k+k_0)\Delta ft} \quad (2)$$

where $0 \leq t < T_{short}$, $\beta_{PRACH}$ is an amplitude-scaling factor in order to conform to the transmit power of PRACH, $k_0 = n_{PRB}^{RA} N_{sc}^{RB} - N_{RB}^{UL} N_{sc}^{RB}/2$, and $\Delta f$ is the sub-carrier spacing. The location in the frequency domain is controlled by the parameter $n_{PRB}^{RA}$; the resource block size in the frequency domain, expressed as a number of subcarriers, is denoted by $N_{sc}^{RB}$, and the uplink bandwidth configuration, expressed in multiples of $N_{sc}^{RB}$, is denoted by $N_{RB}^{UL}$.

A short sequence of the same length as the OFDM symbol 112 is achieved by setting $T = T_{short} = 1/\Delta f$. For some releases of LTE, this sub-carrier spacing equals $\Delta f = 15$ kHz, see, e.g., Table 6.2.3-1 in 3GPP TS 36.211 V11.3.0, such that the length of the short sequence equals $T = T_{short} = 66.6$ μs. With a change in subcarrier spacing to, e.g., $\Delta f = 75$ kHz, then the length of the short symbol equals $T = T_{short} = 13.3$ μs.

The preamble sequence to be transmitted is then constructed by $$s(t) = s_{short}((t - T_{CP}) \bmod (T_{short})) \quad (3)$$

where $0 \leq t < T_{SEQ}$, and $T_{CP}$ is the length of an optional cyclic prefix. Here $T_{SEQ}$ represents the total length of the preamble not counting any special offset indicator sequences.

By this repetition of the short sequence, each short sequence will act as a cyclic prefix for the next short sequence.

With reference to FIG. 3, the short sequence referred to herein as s[n] 117 is according to aspects obtained by sampling the short sequence $s_{short}(t)$ to generate $N_{ZC}-1$ time-discrete and evenly spaced samples over a time duration T 114.

Detection of Preamble Sequences

Figure 4:
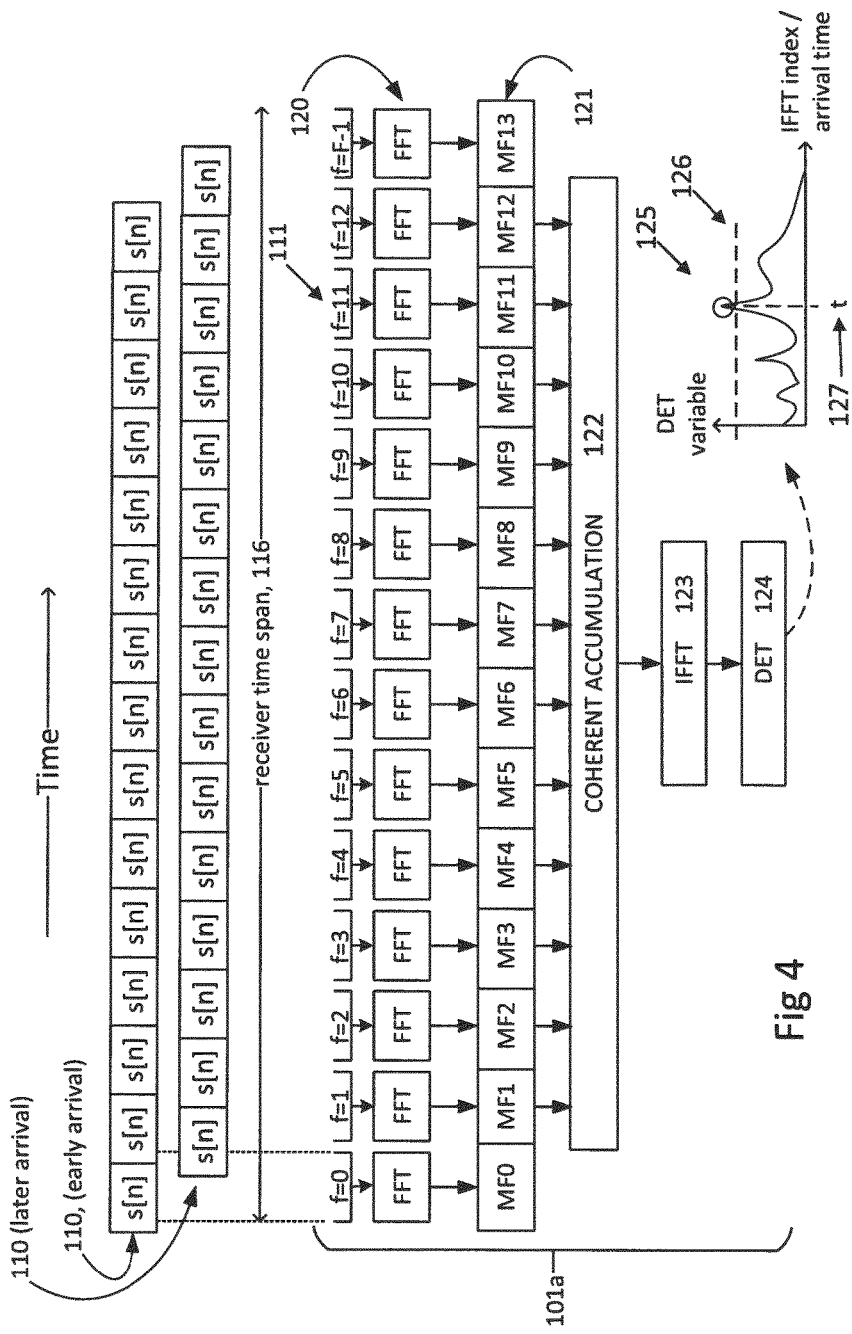
FIG. 4 is a block diagram illustrating aspects of a preamble receiver.

Turning now to FIG. 4, where an example preamble receiver 101a, arranged to detect, e.g., the received preamble sequence 110, is shown.

The preamble receiver 101a is according to some aspects arranged in a network node 101 to receive digitized samples of a received radio signal. The preamble sequences 110 shown in FIG. 4 are examples of such digitized samples. The preamble receiver 101a monitors the received samples over a receiver time span 116, comprising a number of FFT windows 111, and attempts to detect the presence of a preamble signal in the receiver time span 116 by FFT processing of the FFT windows.

Several FFT windows 111 are combined in order to reach sufficient detection performance in, e.g., noise. Thus, a number of FFT time windows 111 are defined, each of which forms the inputs to an FFT 120.

Preamble detection based on different combinations of these FFT windows and FFT outputs are proposed depending of the amount of phase noise, frequency errors, and wireless device speed, as will be further discussed below in connection to FIGS. 11-16.

A wireless device transmitting a preamble sequence over a channel with short coherence time due to, e.g., relative movement at high velocity, could be beneficial to detect using a small number of FFT windows, while the reverse is true for a wireless device transmitting the preamble sequence over a channel with large coherence time, which could be beneficial to detect using a larger number of FFT windows.

Each FFT 120 is followed by a matched filter, MF, 121 which is calculated based on a cyclic shift of the short sequence s[n]. This cyclic shift is determined based on the expected delay of the short sequence in relation to the position of the FFT time window, as will be further clarified below. The output vectors from the matched filters are added coherently 122 and then processed in an inverse FFT 123, IFFT, resulting in a time-domain vector.

A preamble sequence is detected by the preamble receiver 101a detector 124 if a maximum value 125 of the time-domain vector, e.g., in terms of absolute or squared value of the time-domain vector, exceeds a threshold value 126.

By searching for the location of this maximum value in the time-domain vector by the detector 124, a first arrival time t 127 can be estimated. This arrival time estimate equals the sample position in the vector of said maximum value, divided by the length of the inverse FFT size and multiplied by the length of the short sequence in seconds.

In order to describe the detection procedure in more detail, consider a multi-antenna system, receiving a signal r(n,a) at sampling instant n and antenna a and where the FFT windows are indexed by a variable p.

Now, for each antenna a and FFT window p, calculate a DFT or FFT over $N_{FFT}$ samples of the received signal r(n,a) as:

$$R(k, p, a) = \frac{1}{\sqrt{N_{FFT}}} \sum_{n=0}^{N_{FFT}-1} r(n + n_s(p), a)e^{-j2\pi kn/N_{FFT}} \quad (4)$$

for $k = 0, \ldots, N_{FFT} - 1$ and $a = 0, \ldots, N_a - 1$.

The FFT window 111 positions correspond to the distance in time between the start of the subframe and each SC-FDMA or OFDM symbol in uplink. For example, in some releases of LTE, the first cyclic prefix in each slot is 160 samples, while the remaining cyclic prefixes are 144 samples. Each SC-FDMA or OFDM symbol is 2048 samples such that the values of $n_s(p)$ as in Table 1 follow.

TABLE 1

Time shift in samples between sequential OFDM or SC-FDMA symbols.

| p | $n_s(p)$ [samples] |
|---|---|
| 0 | 160 |
| 1 | 160 + 144 + 2048 |
| 2 | 160 + 2 * 144 + 2 * 2048 |
| 3 | 160 + 3 * 144 + 3 * 2048 |
| 4 | 160 + 4 * 144 + 4 * 2048 |
| 5 | 160 + 5 * 144 + 6 * 2048 |
| 6 | 160 + 6 * 144 + 6 * 2048 |
| 7 | 2 * 160 + 6 * 144 + 7 * 2048 |
| 8 | 2 * 160 + 7 * 144 + 8 * 2048 |
| 9 | 2 * 160 + 8 * 144 + 9 * 2048 |
| 10 | 2 * 160 + 9 * 144 + 10 * 2048 |
| 11 | 2 * 160 + 10 * 144 + 11 * 2048 |
| 12 | 2 * 160 + 11 * 144 + 12 * 2048 |
| 13 | 2 * 160 + 12 * 144 + 13 * 2048 |

The PRACH preamble in the frequency domain is obtained by extracting sub-carriers corresponding to those sub-carriers used for PRACH, i.e. $N_{seq}$ samples, where $N_{seq} \leq N_{FFT}$ $$R_{PRACH}(k,p,a) = R(k+k_0,p,a), \quad (5)$$

for $k = 0, \ldots, N_{seq} - 1$ and $k_0 = n_{PRB}^{RA} N_{sc}^{RB} - N_{RB}^{UL} N_{sc}^{RB}/2$. Using the same notation as above, and with the use of Zadoff-Chu sequences, then $N_{seq} = N_{ZC}$.

Multiply with a matched filter, MF 121, of $N_{seq}$ coefficients in the frequency domain $$C_{MF,v}(k, p, a) = \frac{1}{\sqrt{N_{seq}}} P_v^*(k, p) \cdot R_{PRACH}(k, p, a). \quad (6)$$

This matched filter is constructed from the DFT of the known short sequence s[n] and the cyclic shift of this short sequence. The cyclic shift corresponds to a frequency-domain rotation with the shift $n_s(p)$:

$$P_v(k, p) = e^{j2\pi k n_s(p)/N_{FFT}} \frac{1}{\sqrt{N_{seq}}} \sum_{n=0}^{N_{seq}-1} x_u(n) e^{-j2\pi kn/N_{seq}}. \quad (7)$$

The output from the matched filters corresponding to the same antenna, but from different FFT windows, can now be coherently added 122 as $$C_v(k, a) = \sum_{f=f_0}^{f_0+F_0-1} C_{MF,v}(k, f, a) \quad (8)$$

where $f_0$ is the index of the first, out of $F_0$, FFT windows included in the PRACH preamble detector. See, e.g., FIG. 4 for which $f_0=1$ and $F=12$.

Now, in order to detect preamble and estimate arrival time, the output from the coherent addition will be transformed to the time domain. Calculate an IDFT, of size $N_{IFFT}$, resulting in a correlation vector of length $N_{IFFT}$:

$$c_v(m, a) = \frac{1}{\sqrt{N_{IFFT}}} \sum_{k=0}^{N_{seq}-1} C_v(k, a) e^{j2\pi km/N_{IFFT}} \quad (9)$$

for m=0, ..., $N_{IFFT}-1$. Selecting $N_{IFFT} > N_{seq}$ to an interpolation, which can be done in order to increase the resolution of the timing estimation.

A simple estimator of noise variance $\hat{\sigma}_w^2(a)$ in the received signal r(n,a) can be formulated as $$\hat{\sigma}_w^2(a) = \sum_{f=f_0}^{f_0+F_0-1} \sum_{k=0}^{N_{seq}-1} |C_{MF,v}(k, f, a)|^2. \quad (10)$$

As decision variables, the absolute square for each value of the cross-correlation vector is used, normalized with the estimated noise variance $\hat{\sigma}_w^2(a)$, $$\lambda_v(m) = \sum_{a=0}^{N_a-1} \frac{|c_v(m, a)|^2}{\hat{\sigma}_w^2(a)} \quad (11)$$

where a summation over antennas, including polarizations, is included. A preamble detector and arrival time estimator can, according to aspects, be formulated as searching for the maximum value in this vector of normalized absolute squared correlations and comparing this maximum value with a threshold.

According to one aspect, preamble number v is detected if the absolute squared value of this autocorrelation exceeds a threshold $$\lambda_v(m) = \sum_{a=0}^{N_a-1} \frac{|c_v(m, a)|^2}{\hat{\sigma}_w^2(a)} \geq \lambda_{Threshold} \quad (4)$$

for at least one value of m, within the search window of size W. In other words, the preamble with index v is detected if there is an m∈[0,W−1] such that $\lambda_v(m) \geq \lambda_{Threshold}$. This preamble detector threshold $\lambda_{Threshold}$ should be selected with care such that the false detection rate is low without causing a too low detection rate.

A timing estimate follows as the value of m which corresponds to the maximum value of $\lambda_v(m)$, i.e., $$\hat{m} = \mathrm{argmax}_m \left( \sum_{a=0}^{N_a-1} \frac{|c_v(m, a)|^2}{\hat{\sigma}_w^2(a)} \right) \quad (5)$$

such that the timing error in seconds equals $$\hat{T}_{err} = \hat{m}/(\Delta f \cdot N_{IFFT}). \quad (14)$$

Thus, by the present technique, no dedicated FFT for receiving PRACH is necessary in the preamble receiver. This is especially important if FFT operations are performed for a large number of receiver antennas, due to the significant savings in, e.g., hardware processing resources.

Ambiguity of the Arrival Time Estimates

Figure 5:
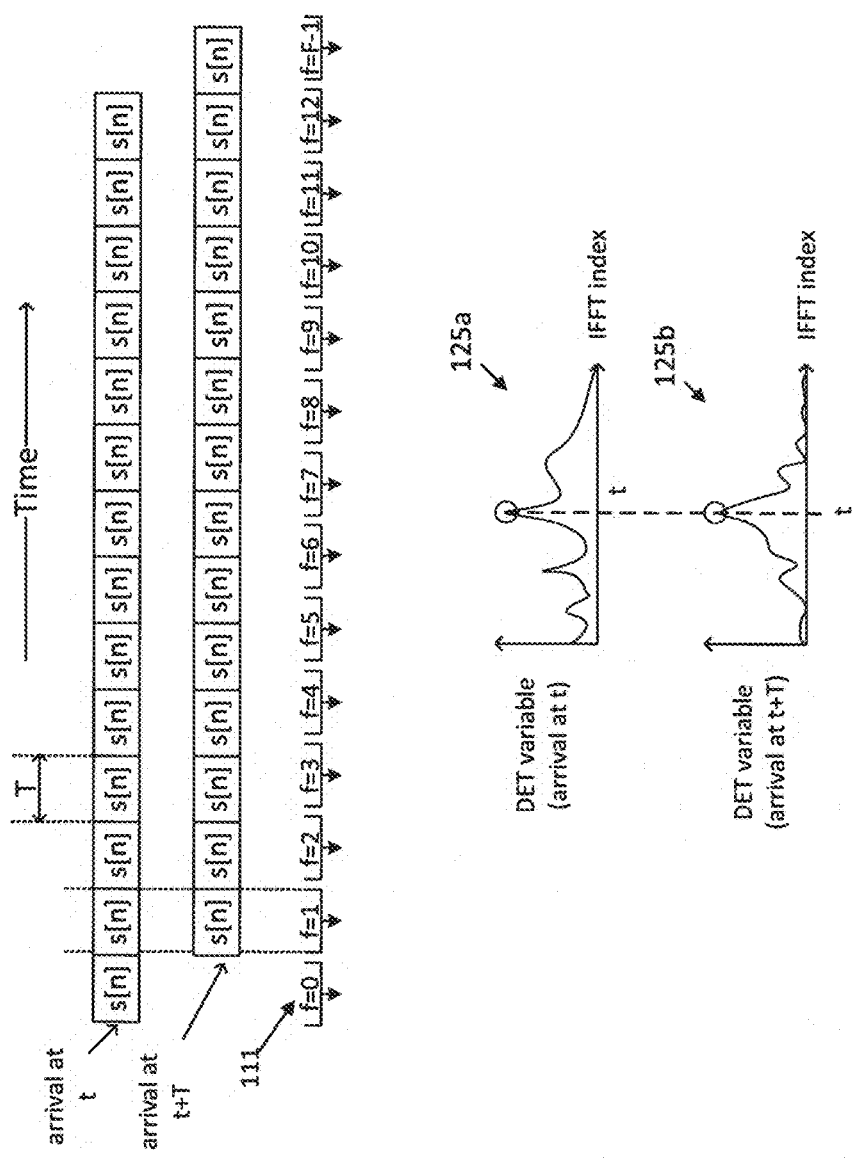
FIG. 5 illustrates ambiguity in arrival time estimation of a preamble sequence.

It is noted that this first arrival time estimate given in Equation 13 above is limited to the time duration T of the short sequence s[n]. This limitation gives rise to an ambiguity in arrival time estimates which are based solely on the individual short sequences. FIG. 5 illustrates this ambiguity in arrival time estimation of a preamble sequence. Here, it is seen 125a, 125b, that two preamble sequences arriving with an offset in time equal to the time duration of the short sequence s[n] gives rise to the same arrival time estimate, i.e., the same peak in the IFFT time-domain vector. This phenomenon results from the periodic nature of the preamble sequence, and is referred to herein as arrival time ambiguity, in that one cannot ascertain from the peaks 125a, 125b shown in FIG. 5 alone what the true arrival time of the preamble signal is. In other words the arrival time can only be estimated up to the time duration T of the short sequence by an estimator of arrival time which only considers the individual short sequences s[n]. If there is prior information regarding a maximum propagation delay $t_p < T$ in a network, then this ambiguity does not present a problem. However, in a network with larger cells where potentially $t_p > T$, then this ambiguity can become an inconvenience.

In LTE, the SC-FDMA symbol used in uplink has a length of 66.6 microseconds, see, e.g., 3GPP TS 36.211, section 5.6 with $T_s$ defined in section 4. This time duration corresponds to a travelled distance of $66.6 \cdot 10^{-6}$ c=20 kilometers, where $c=3 \cdot 10^8$ is the speed of light. A reduction of the SC-FDMA or OFDM symbol length compared to the length used for some releases of LTE, see, e.g., 3GPP TS 36.211, section 5.6, would further reduce the maximum arrival time possible to estimate.

Proposed Method in a Wireless Device

Figure 6:
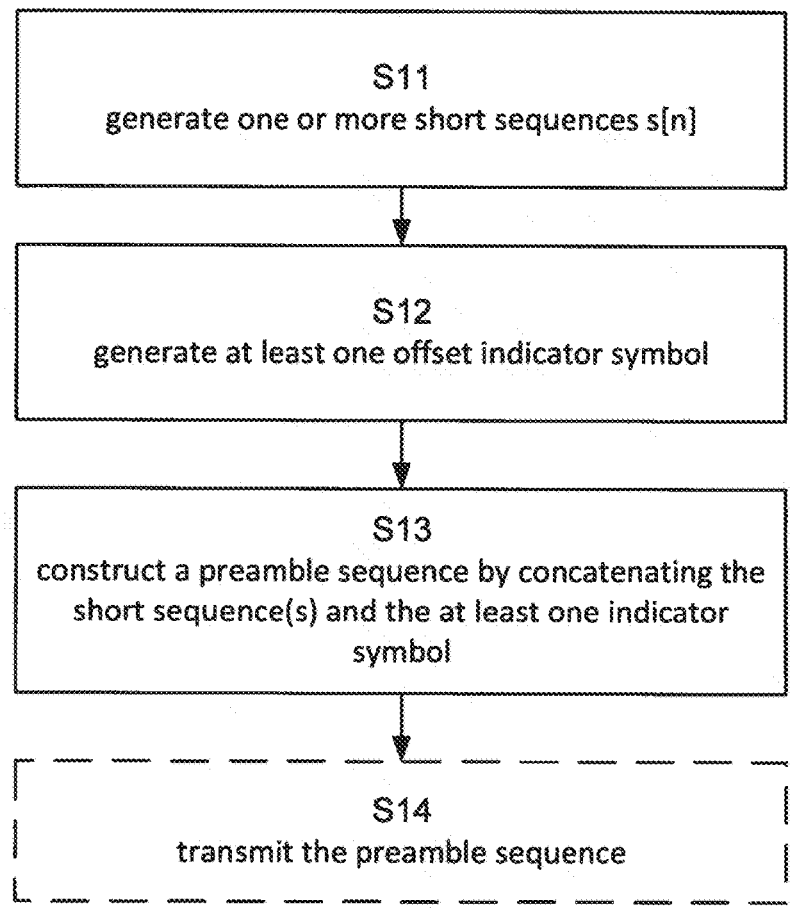
FIG. 6 is a flowchart illustrating embodiments of method steps performed in a wireless device.

FIG. 6 shows a flowchart illustrating embodiments of method steps performed in a wireless device. In particular, there is shown a method in a wireless device 102, 102a for processing a preamble sequence 110a, 110b, 110c, 110d. The method comprises generating S11 one or more identical short sequences s[n]. Each of these short sequences has the same time duration T as an OFDM symbol 112 used for carrying data traffic in a radio access network 100 of the wireless device.

Thus, as was discussed in connection to FIGS. 3 and 4, the same sized FFT can be used for processing both data and preamble sequences. Thus, there is no need for a dedicated FFT to process the preamble sequence in a preamble receiver. Consequently, drawbacks and limitations associated with having a dedicated large FFT used only for detecting preamble sequences are avoided.

The method also comprise generating S12 at least one offset indicator sequence 130a, 130b, 130c, 130d different from each of the short sequences s[n], and constructing S13 the preamble sequence by concatenating the at least one offset indicator sequence and the one or more identical short sequences s[n] in time, such that each of the at least one offset indicator sequence has a respective pre-determined location in the preamble sequence.

The method further, according to an aspect, comprises transmitting S14 the constructed preamble sequence 110a, 110b, 110c, 110d to a preamble receiver 101 in the radio access network 100 of the wireless device 102, 102a.

As will be further detailed in connection to FIGS. 11-16 below, the feature of the at least one offset indicator sequence different from each of the short sequences serves to resolve the above-mentioned ambiguity in estimating arrival time, and thus enables estimation of propagation delays in excess of the time duration T of the short sequence.

Consequently, a preamble sequence format is proposed herein which supports operation in large cells where signal propagation delays can exceed the time duration T of OFDM symbols 112 used for carrying data traffic. The proposed preamble sequence format therefore allows for both reliable and efficient random access as well as for accurate timing offset estimation of, e.g., a received PRACH signal, in small cells as well as in large cells.

FIGS. 7a-7d schematically illustrate aspects of a preamble sequence. The preamble sequences all comprise short sequences s[n] of time duration T, which is the same time duration as that of an OFDM, symbol 112 carrying data traffic in the radio access network 100.

The preamble sequences further comprise one or more offset indicator sequences at different locations in the preamble sequences. Here, the preamble sequences are all shown to comprise one offset indicator sequence at the preamble sequence end 131, but this is not necessary. On the contrary, offset indicator sequences may be located anywhere throughput the preamble sequence.

Nevertheless, according to some aspects, the preamble sequence 110a, 110b, 110c, 110d comprises a first offset indicator sequence 130a having a respective first pre-determined location at an end 131 of the preamble sequence 110a, 110b, 110c, 110d, and according to some other aspects, the preamble sequence 110b comprises a second offset indicator sequence 130b, 130c, 130d having a respective second pre-determined location in the preamble sequence 110b, 110c such that there is at least one short sequence s[n] located before, and at least one other short sequence s[n] located after, the second offset indicator sequence 130b, 130c in the preamble sequence 110b.

According to some aspects, each of the at least one offset indicator sequence 130a, 130b, 130c, 130d has a respective pre-determined time duration Ta, Tb, Tc, Td, Te.

One or more of the at least one offset indicator sequence 130a, 130b, 130c, and 130d has, according to aspects, zero amplitude. The preamble sequence 110a, 110b, 110c, and 110d consequently then has at least one respective empty interval at the pre-determined location.

The offset indicator sequences thus, according to some aspects, appear as gaps in the preamble sequence. However, according to other aspects, the offset indicator sequences take on an arbitrary amplitude or phase trajectory different in some way from the short sequences s[n]. The reason that the offset indicator sequences need to be different from the short sequences s[n] is that, if they are different from the short sequences, then they can be distinguished from the short sequences s[n], and thus the arrival time ambiguity can be resolved.

Figure 8:
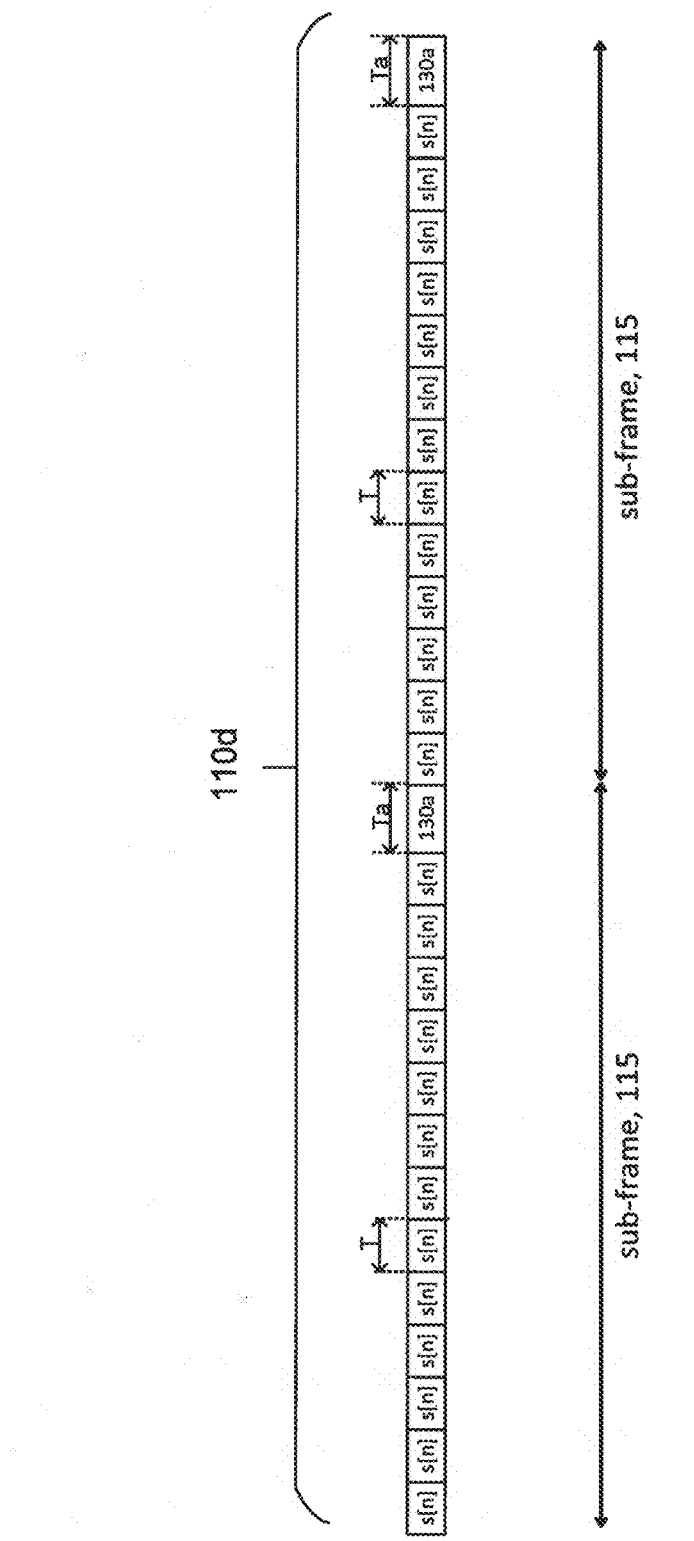
FIG. 8 schematically illustrates aspects of a preamble sequence.

FIG. 8 shows one additional example of a preamble sequence 110d which extends over more than one sub-frame 115. Hence, according to aspects, the constructed preamble sequence 110d occupies two or more sub-frames 115 of a radio access technology of the radio access network 100 of the wireless device 102, 102a. Having this type of long preamble sequence allows for random access in, e.g., scenarios where the preamble signal needs to carry a large amount of energy in order to overcome noise or interference.

There is also disclosed herein a computer program comprising computer program code which, when executed in a wireless device 102, 102a, causes the wireless device to execute a method according to any of the method aspects discussed in connection to FIG. 7.

Proposed Method in a Preamble Receiver

Figure 9:
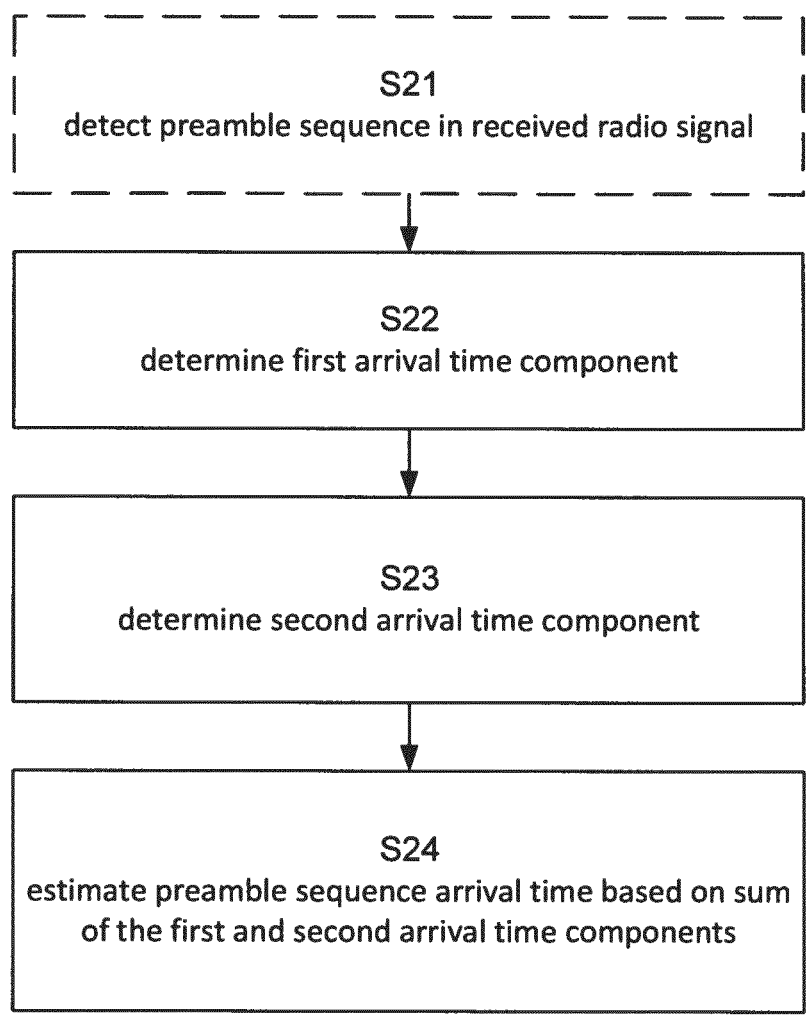
FIG. 9 is a flowchart illustrating embodiments of method steps performed in a preamble receiver.

FIG. 9 shows a flowchart illustrating embodiments of method steps performed in a preamble receiver. According to aspects, the preamble receiver constitutes part of a network node, in which case the method is performed in the network node.

In particular, there is shown a method in a preamble receiver 101a, 101b, 101c, 101d, 101e, 101f, 101g for processing a preamble sequence 110a, 110b, 110c, 110d comprising one or more identical short sequences s[n] and at least one offset indicator sequence 130a, 130b, 130c, 130d. The at least one offset indicator sequence is different from each of the short sequences s[n] and located at a respective pre-determined location in the preamble sequence.

The method comprises determining S22 a first arrival time component 171 as an arrival time of the preamble sequence 110a, 110b, 110c, 110d up to an unknown integer multiple of a time duration T of the short sequence s[n], based on Fast Fourier Transform, FFT, processing of a received radio signal. The size of the FFT here equals a size of an FFT used for detecting an OFDM symbol 112 carrying data traffic in a radio access network 100 of the preamble receiver.

Thus, as discussed above and illustrated in connection to FIG. 5, the first arrival time component is associated with ambiguity, in that arrival times are only estimated up to an unknown integer multiple of a time duration T of the short sequence s[n].

Examples of ways to determine the first arrival time component was discussed above in connection to FIG. 4 and the section on detection of preamble sequences.

To resolve the above-mentioned ambiguity, the method also comprises determining S23 a second arrival time component 173 as an arrival time of the preamble sequence in terms of an integer multiple of the time duration T of the short sequence s[n], based on the at least one offset indicator sequence and also estimating S24 the arrival time of the preamble sequence based on a sum of the first 171 and the second 173 arrival time component.

In addition to estimating arrival time, the method, according to aspects, further comprises detecting S21 the preamble sequence in the received radio signal based on FFT processing of the received radio signal, and estimating S24 the arrival time of the preamble sequence if the preamble sequence is detected.

There is also disclosed herein a computer program comprising computer program code which, when executed in a preamble receiver, causes the preamble receiver to execute a method according to any of the method aspects discussed in connection to FIG. 9.

Wireless Devices, Preamble Transmitters

Figure 10:
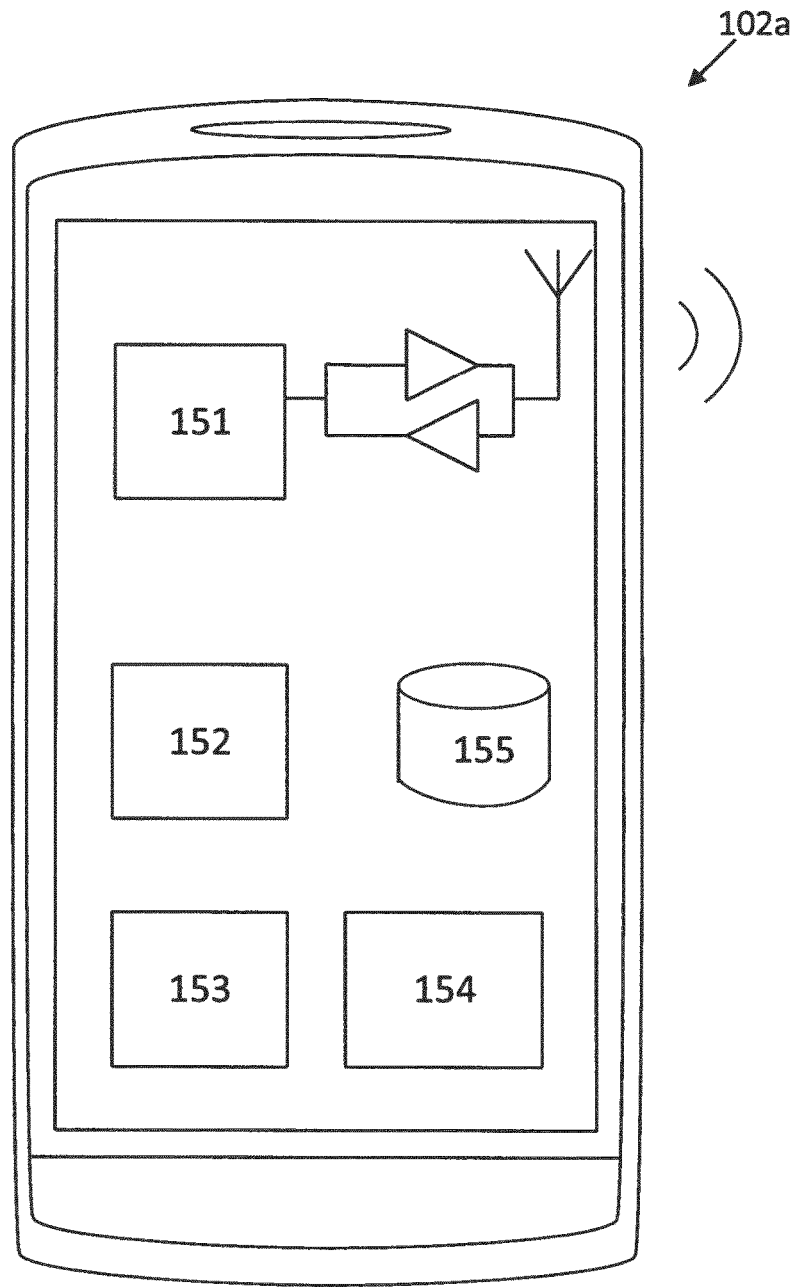
FIG. 10 is a block diagram illustrating embodiments of a wireless device.

FIG. 10 shows a wireless device 102, 102a arranged to process a preamble sequence 110a, 110b, 110c, and 110d. The wireless device 102, 102a comprises a short sequence generator unit 152 arranged to generate one or more identical short sequences s[n]. Each of the short sequences has a same time duration T as an OFDM symbol 112 used for carrying data traffic in a radio access network 100 of the wireless device 102. The wireless device also comprises an offset indicator sequence generator unit 153 arranged to generate at least one offset indicator sequence 130a, 130b, 130c, 130d having an amplitude and/or a phase different from each of the short sequences s[n], and a preamble sequence constructor unit 154 arranged to construct the preamble sequence by concatenating the at least one offset indicator sequence and the one or more identical short sequences s[n] in time, such that each of the at least one offset indicator sequence has a respective pre-determined location in the preamble sequence.

The wireless device 102, 102a, according to aspects, further comprises a communications interface 151 arranged to transmit the preamble sequence to a preamble receiver 101 in the radio access network 100 of the wireless device 102, 102a. Thus, according to some aspects, the wireless device 102, 102a is referred to as a preamble transmitter.

Figure 7:
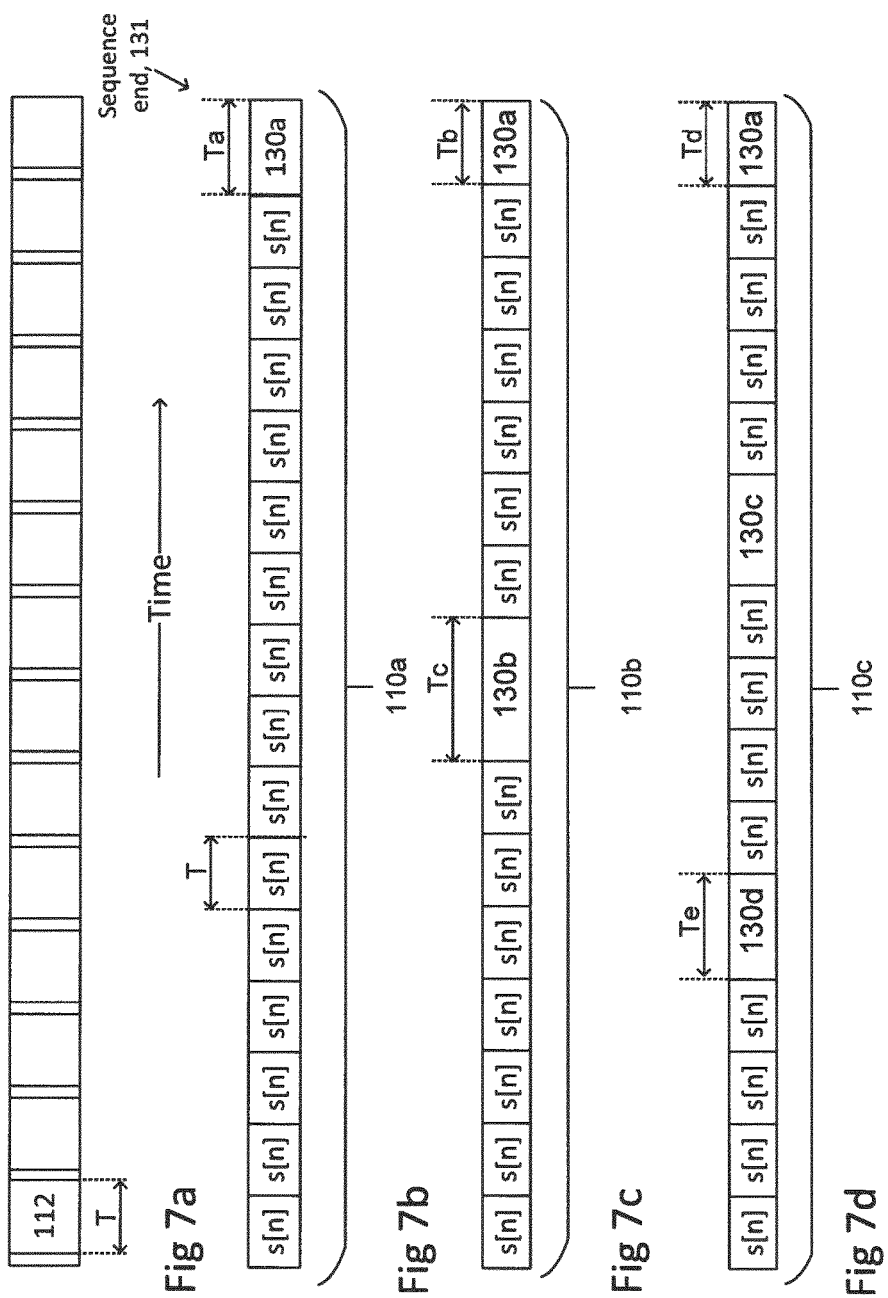
FIGS. 7a-d schematically illustrate aspects of a preamble sequence.

Consequently, the wireless device 102, 102a is, according to aspects, configured to generate and to transmit any of the preamble sequences shown in FIGS. 7 and 8.

The short sequence can, e.g., be constructed by the wireless device using Zadoff-Chu sequences. Thus, according to one aspect, the short sequence s[n] is a Zadoff-Chu sequence. The Zadoff-Chu sequences are a special instance of the more general constant amplitude—zero autocorrelation, CAZAC, sequences. Thus, according to another aspect, the short sequence s[n] is a CAZAC sequence. The short sequence s[n] can also be made up in some other way, a main property of the short sequence s[n] being that is has equal length as the 'regular' OFDM symbols 112 of the system.

According to some aspects, the offset indicator sequence generator unit 153 is arranged to generate one or more of the at least one offset indicator sequence 130a, 130b, 130c, 130d with zero amplitude, the preamble sequence consequently has at least one empty interval at the respective pre-determined location.

According to some other aspects, the preamble sequence constructor unit 154 is configured to generate a preamble sequence 110a comprising a first offset indicator sequence 130a having a respective first pre-determined location at an end of the preamble sequence 110a.

According to further aspects, the preamble sequence constructor unit 154 is further configured to generate a preamble sequence 110b comprising a second offset indicator sequence 130b having a respective second pre-determined location in the preamble sequence 110b, and at least two short sequences s[n], such that there is at least one short sequence s[n] located before, and at least one other short sequence s[n] located after the second offset indicator sequence 130b in the preamble sequence 110b.

Preamble Receivers

Figure 11:
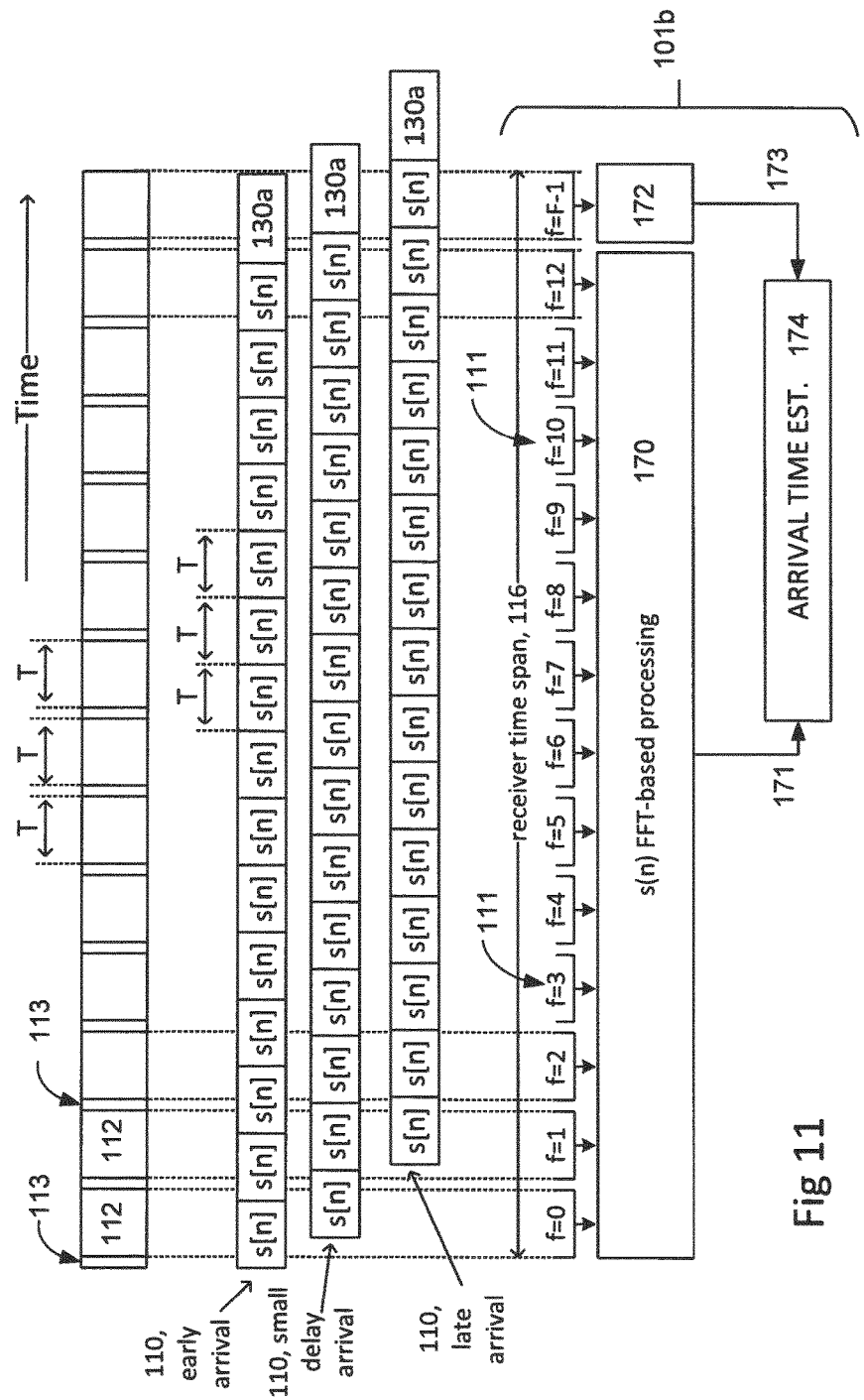
FIGS. 11-16 are block diagrams schematically illustrating aspects of a preamble receiver.

FIG. 11 shows a preamble receiver 101b arranged to process a preamble sequence 110a, 110b, 110c, 110d comprising one or more identical short sequences s[n] and at least one offset indicator sequence 130a, 130b, 130c, 130d. The at least one offset indicator sequence has a respective pre-determined location in the preamble sequence, and is different from each of the short sequences s[n].

The short sequence can, e.g., be constructed by the wireless device using Zadoff-Chu sequences. Thus, according to one aspect, the short sequence s[n] is a Zadoff-Chu sequence. The Zadoff-Chu sequences are a special instance of the more general class of constant amplitude—zero autocorrelation, CAZAC, sequences. Thus, according to another aspect, the short sequence s[n] is a CAZAC sequence. The short sequence s[n] can also be made up in some other way, a main property of the short sequence s[n] being that is has equal length as the 'regular' OFDM symbols 112 of the system, such that it can be processed by a same sized FFT window 111.

The preamble receiver 101b comprises a short sequence processing unit 170 arranged to determine a first arrival time component 171 as an arrival time of the preamble sequence up to an unknown integer multiple of the time duration T of the short sequence s[n], based on FFT processing 170 of the one or more identical short sequences s[n], wherein the size of the FFT equals the size of an FFT used for detecting an OFDM symbol 112 carrying data traffic in a radio access network 100 of the preamble receiver, c.f. FIG. 4.

Examples of implementations of the short sequence processing unit 170 were discussed above in connection to FIG. 4 and the section on detection of preamble sequences.

In order to resolve the above-mentioned arrival time ambiguity stemming from the repetition of identical short sequences, the preamble receiver 101b further comprises a preamble sequence offset detector 172 arranged to determine a second arrival time component 173 as an arrival time of the preamble sequence in terms of an integer multiple of the time duration T of the short sequence s[n], based on processing of the at least one offset indicator sequence 130a, 130b, 130c, 130d. The first and the second arrival time components are received by an arrival time estimator unit 174 arranged to estimate the arrival time of the preamble sequence 110a, 110b, 110c, 110d based on the sum of the first 171 and the second 173 arrival time components.

According to some aspects the arrival time of the preamble sequence is determined as the sum of the first 171 and the second 173 arrival time components.

According to some other aspects, the short sequence processing unit 170 is further arranged to detect the preamble sequence in a received radio signal based on FFT processing of the received radio signal. Thus, detection and arrival time estimation are performed jointly by the preamble receiver.

Figure 12:
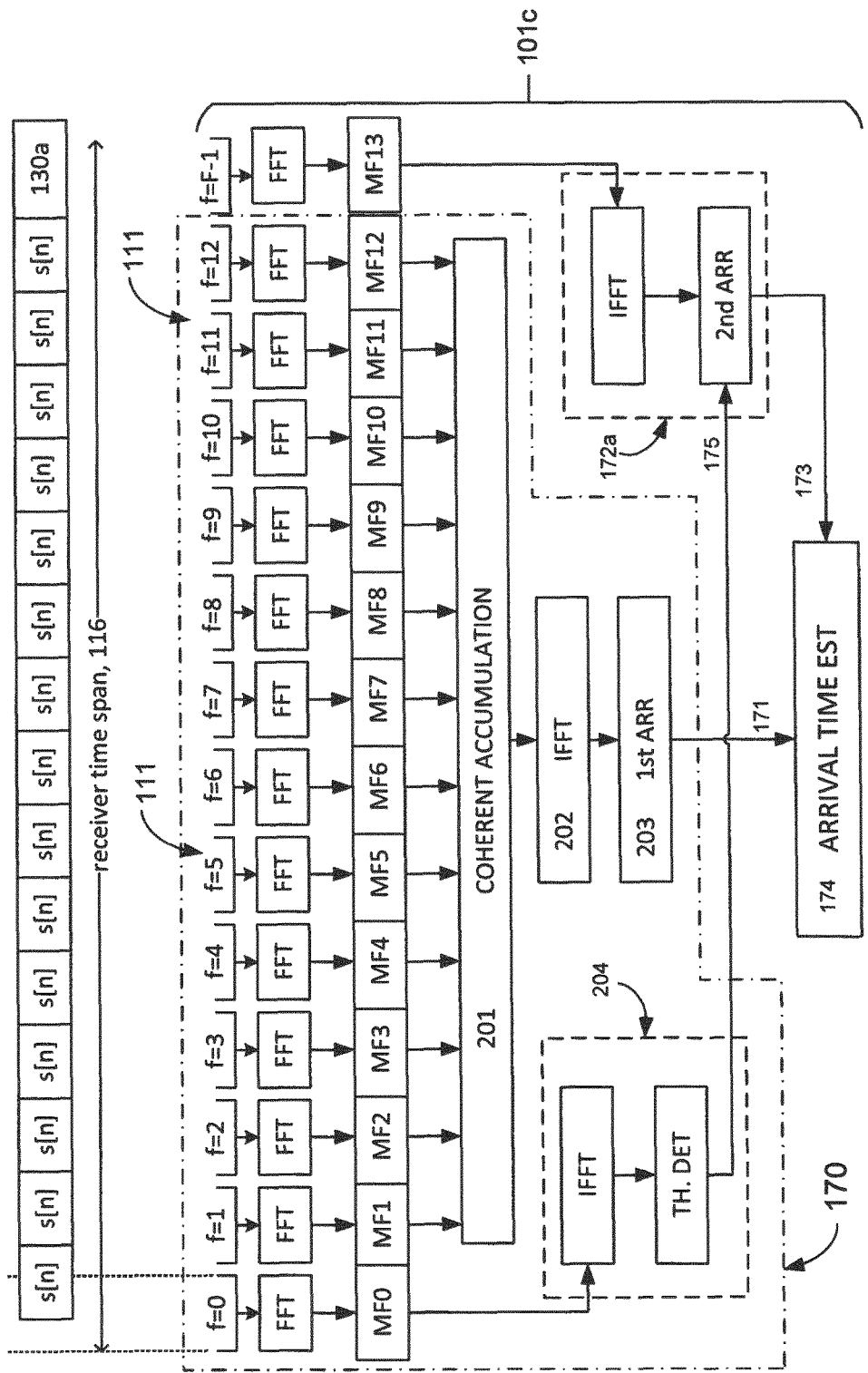

FIG. 12 shows aspects of a preamble receiver 101c wherein the preamble receiver is configured to process the preamble sequence using a number F of FFT windows 111 arranged sequentially in time over a receiver time span 116 and indexed by a variable f from 0 through F−1, wherein a first offset indicator sequence 130a has zero amplitude and a respective pre-determined location at an end 131 of the preamble sequence. The preamble sequence offset detector 172 then comprises a first late arrival detector 172a which is arranged to determine a value of a first metric indicating the presence of a short sequence s[n] at the end of said receiver time span by an FFT window having index f=F−1.

A principle of the late arrival detectors disclosed herein is to discern the location of the offset indicator sequence in the received preamble sequence. Once the position of the offset indicator sequences has been determined, the ambiguity can be resolved, since the at least one offset indicator sequence has a respective pre-determined location in the preamble sequence, and is different from each of the short sequences s[n].

The preamble sequence offset detector 172 shown in FIG. 12 is arranged to determine the second arrival time component 173 as zero in case the value of the first metric is lower than a detection threshold, and to determine the second arrival time component 173 as one short sequence s[n] time duration T in case the value of the first metric is higher than the detection threshold.

Thus, the preamble receiver 101c shown in FIG. 12 can unambiguously estimate arrival times up to, but not including 2T.

FIG. 12 further shows additional aspects of a preamble receiver wherein the short sequence processing unit 170 further comprises an early arrival detector 204 arranged to determine a value of a second metric 175 indicating the presence of a short sequence s[n] at the beginning of the receiver time span by FFT processing of an FFT window having index f=0. The detection threshold is here set to equal the value of the second metric 175.

Thus, in addition to those FFT windows in the receiver time span 116 used to determine the first arrival time component, two additional FFT windows are used in FIG. 12 for arrival time estimation, one before and one after the FFT windows used to determine the first arrival time component 171. The samples in the FFT windows with indices 0 and F−1 for the early and late arrival detectors, respectively, are fed to individual FFTs, matched filters MF0 and MF13, as well as IFFTs.

According to some aspects, the results from the IFFTs are fed through absolute square operations. Then, a vector with these absolute values, potentially scaled with a noise variance estimate, and finally summed over all antennas and polarizations are calculated. The maximum value of this vector is referred to as an offset decision variable.

An alternative offset decision variable is to use the sum of all values after the absolute square operation.

Yet another alternative method to calculate an offset decision variable is to add the absolute square values over small intervals of the vector with absolute square values, scaled with a noise variance estimate, and then use the maximum value over several such intervals as decision variable.

If the decision variable for the early arrival detection, i.e., the value of the second metric 175, is larger than the decision variable for the late arrival detection, i.e., the value of the first metric, then zero is added to the first arrival time component. If, on the other hand, the decision variable for the early arrival detection is smaller than the decision variable for the late arrival, then a constant value of T is added to the arrival time estimate.

Thus, according to some aspects, the early arrival detector 204 and the late arrival detector 172a together ascertain the location of the offset indicator sequence in he received preamble sequence. Once this location has been determined, the arrival time ambiguity can be resolved.

Figure 13:
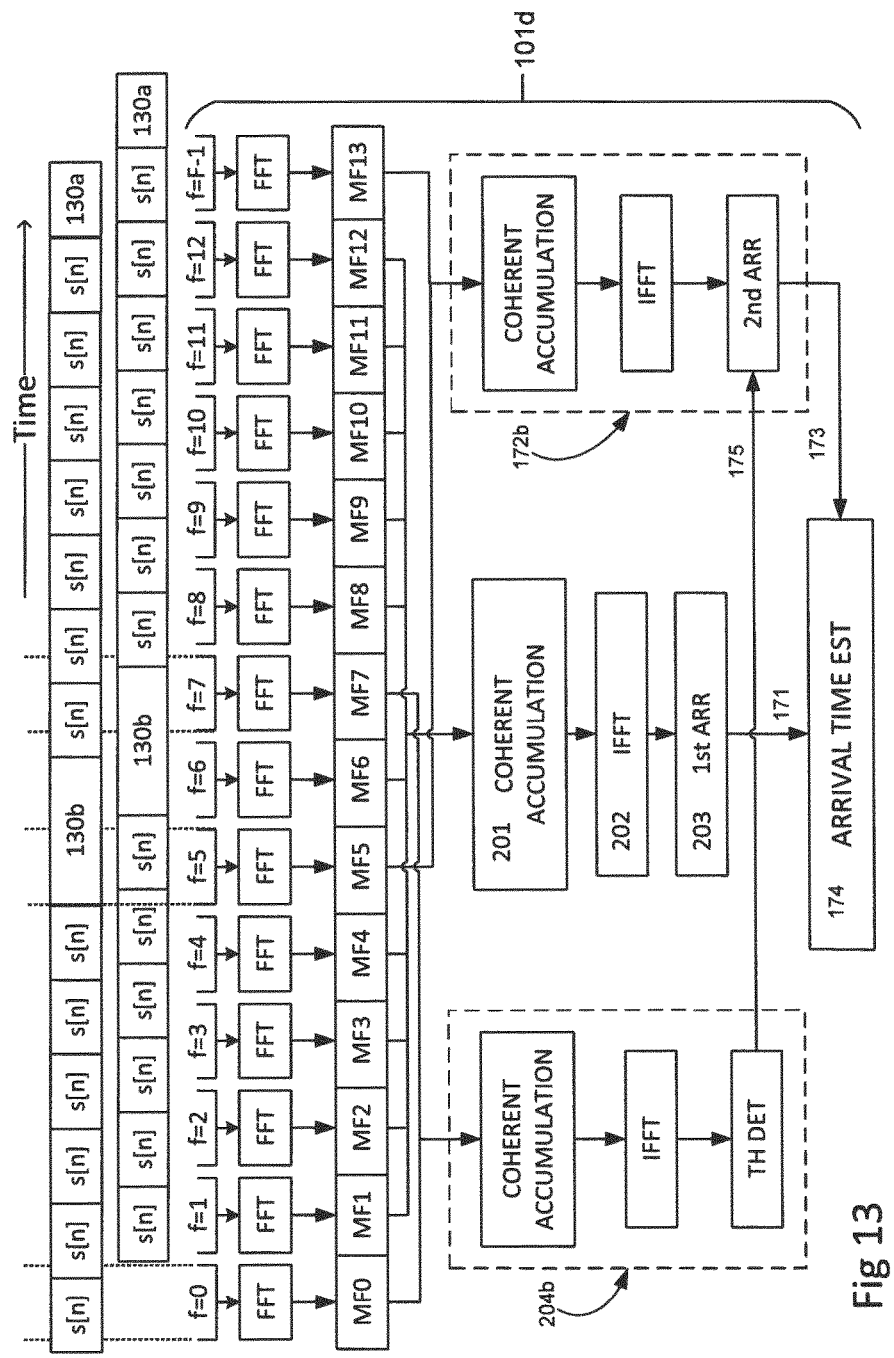

Turning now to FIG. 13 which shows aspects of a preamble receiver 101d wherein a second offset indicator sequence 130b has zero amplitude and a respective pre-determined location substantially in the middle of the preamble sequence, and the first late arrival detector 172b is further arranged to determine the value of the first metric based on FFT processing of an FFT window corresponding to the second location.

Thus, the first late arrival detector 172b coherently accumulates the outputs of more than one matched filter in order to improve on detection performance of the offset indicator sequence or symbols.

According to some aspects, the early arrival detector 204b shown in FIG. 13 is further arranged to determine the value of the second metric based on FFT processing of an FFT window after the FFT window corresponding to the second location.

Thus, the early arrival detector 204b coherently accumulates the outputs of more than one matched filter in order to improve on the determining of the detection threshold.

In this way, a gap in the preamble sequence can be configured in order to improve performance of the early and late arrival detectors, i.e., the determining of the first and the second metric values. Here, the FFT windows to be included in the determining of the first arrival time component have been reduced as compared to the preamble receiver shown in FIG. 12. However, on the other hand, the numbers of FFT windows included for determining the second arrival time component have been increased.

Figure 14:
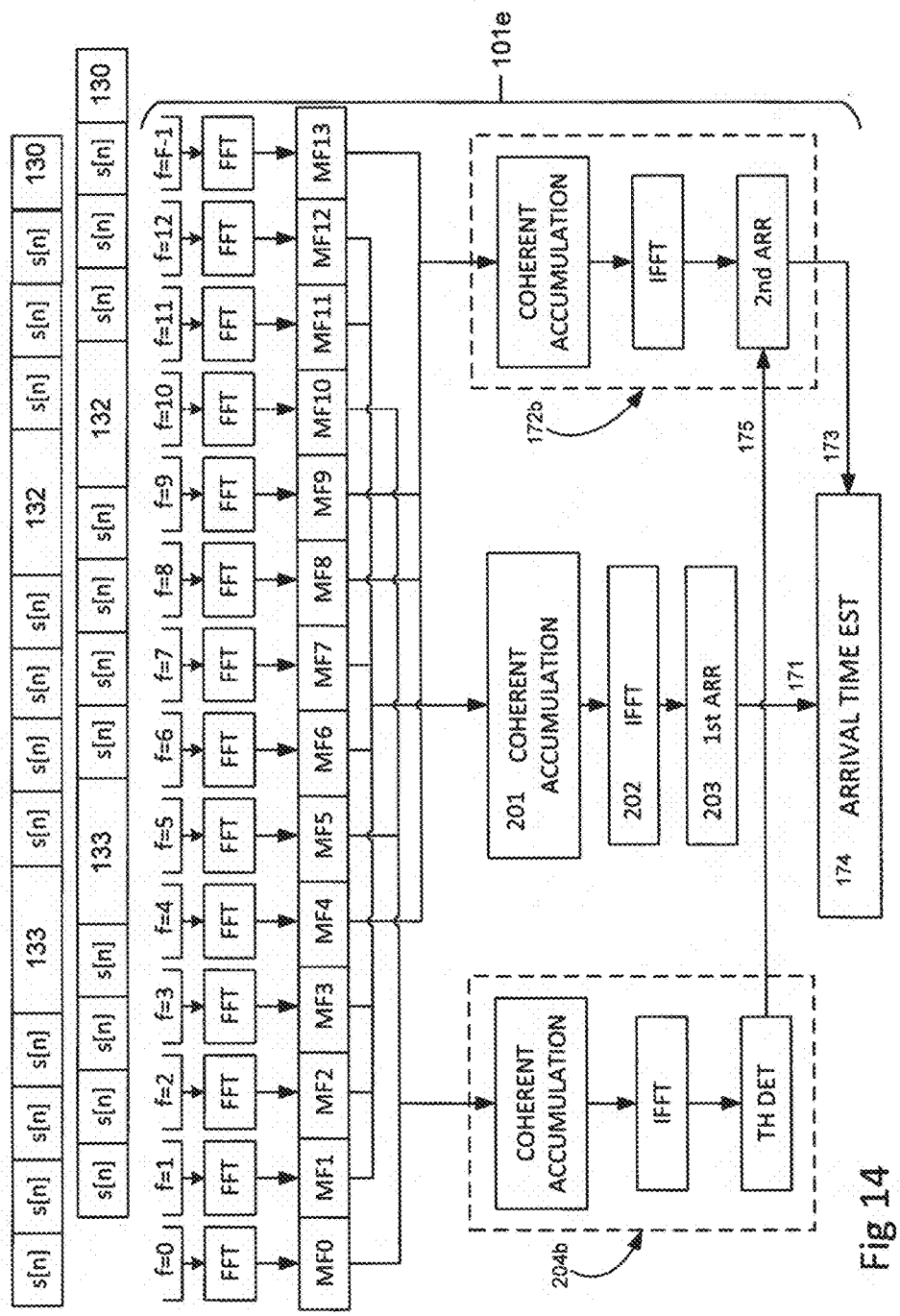

Yet another example is given in FIG. 14, in which two gaps corresponding to two offset indicator sequences 132, 133 have been included in the preamble sequence in addition to the offset indicator sequence 130 at the sequence end.

Figure 15:
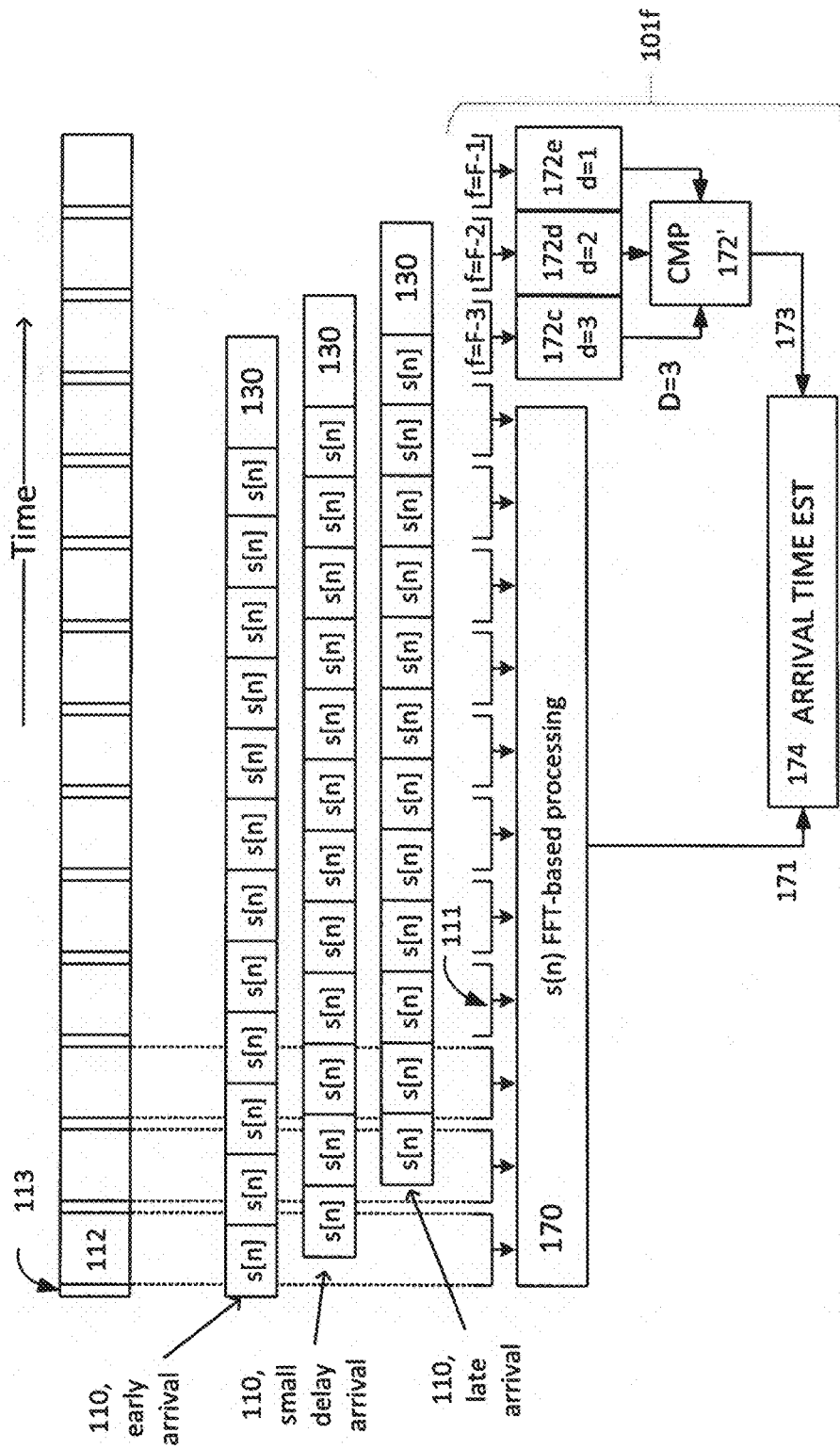

FIG. 15 shows aspects of a preamble receiver 101f which illustrates a generalization of the above discussed concept. This preamble receiver 101f further comprises a number D of late arrival detectors 172c, 172d, 172e indexed by a variable d from 1 through D. Each of the D late arrival detectors 172c, 172d, 172e is arranged to determine a respective metric value indicating a presence of the short sequence s[n] at a respective FFT window with an index f=F−d. The preamble sequence offset detector 172 is then arranged to determine the arrival time of the preamble sequence based on comparison 172' between the respective metric values determined by the plurality of late arrival detectors 172c, 172d, 172e with respect to the detection threshold.

In this way, ambiguity in the arrival time estimate can be resolved since it is here assumed known that the preamble sequence comprises an offset indicator sequence at the sequence end. It is noted that the offset indicator sequence does not need to be located at the preamble sequence end, it can be located anywhere in the preamble sequence, wherein the number D of late arrival detectors must be relocated to correspond to the pre-determined location of the offset indicator sequence.

Thus, for small delays there should be no power detected by the late arrival detector with index d=3. However, in case this d=3 late arrival detector detects significant energy, then it/s likely that the ambiguity is correctly resolved by adding a second arrival time component of one short sequence time duration T to the first arrival time component. Similarly, in case the late arrival detector with index d=2 detects the strongest signal, then it is likely that the ambiguity is correctly resolved by adding a second arrival time component of two short sequence time durations, i.e., 2T, to the first arrival time component.

The number D of late arrival detectors can furthermore be combined with the type of early arrival detectors described in connection to FIGS. 13 and 14.

Figure 16:
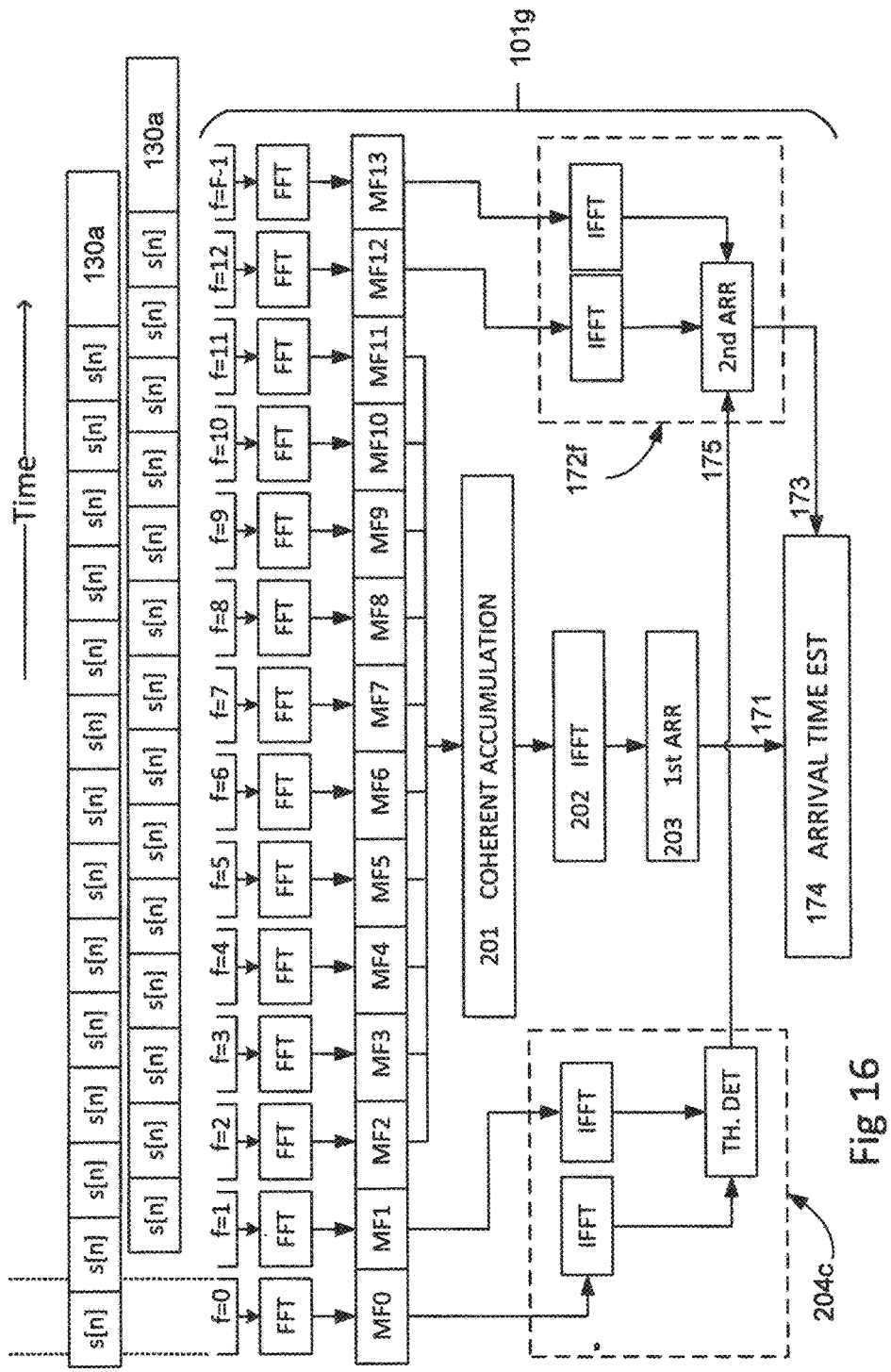

FIG. 16 shows an example along these lines of how late arrival detection can be further refined by increasing the number of FFT windows to be included in early and late arrival detections when delays can correspond to the length of more than one short sequence. Here, each of the late arrival detectors is associated with an early arrival detector used for setting the detection threshold of the respective late arrival detector.

Figure 17:
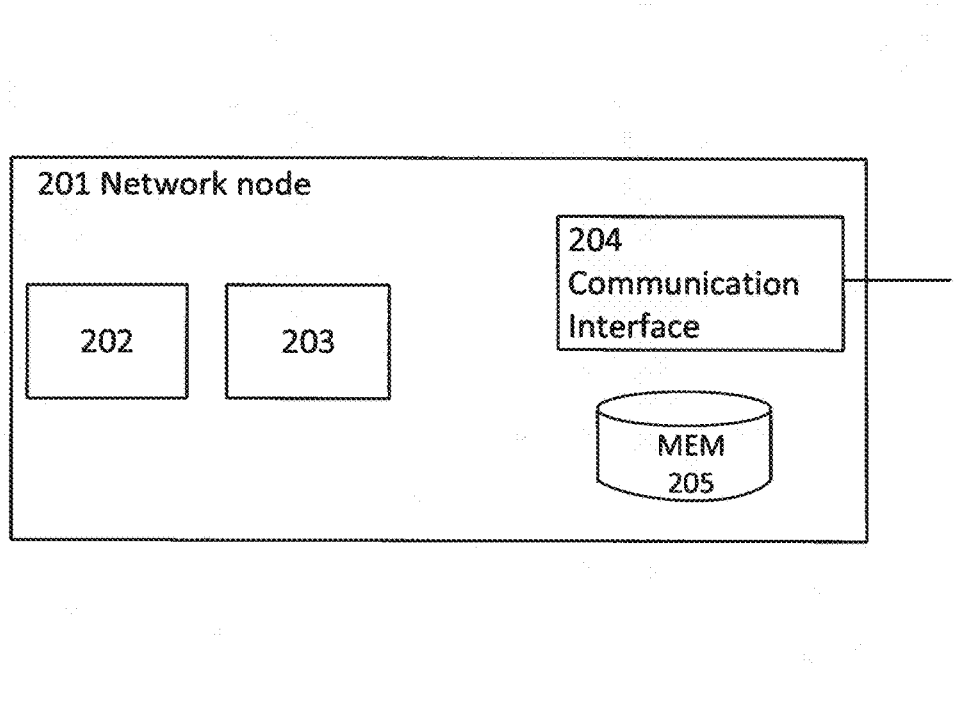
FIG. 17 is a block diagram illustrating aspects of a network node.

FIG. 17 shows a network node 201 comprising a communication interface 204 and the preamble receiver according to the present teaching.

With reference to FIG. 1, there is further disclosed herein a preamble transmitter and receiver system 300 comprising at least one wireless device 102 and at least one preamble receiver 101 according to the present teaching.

Figure 18B:
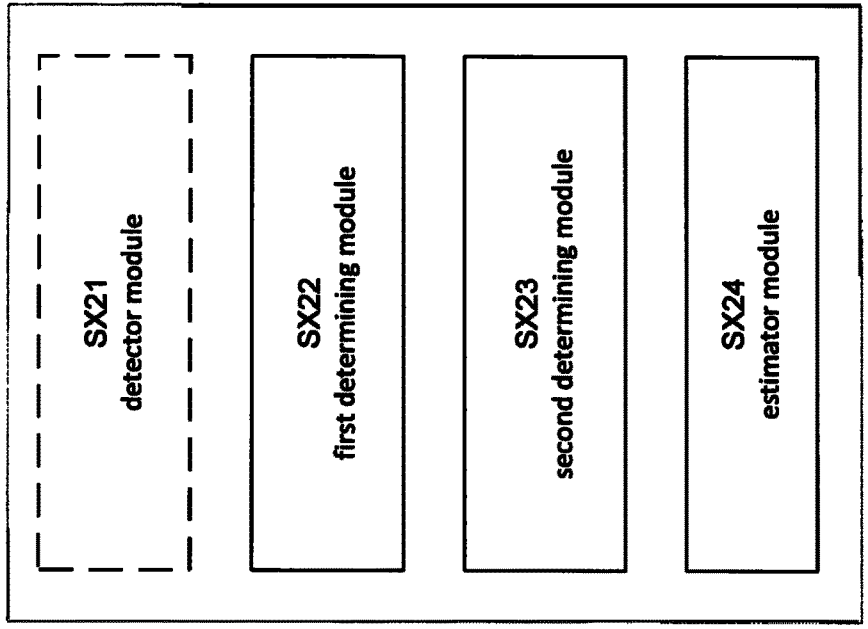
FIG. 18b is a block diagram illustrating aspects of a preamble receiver.
Figure 18A:
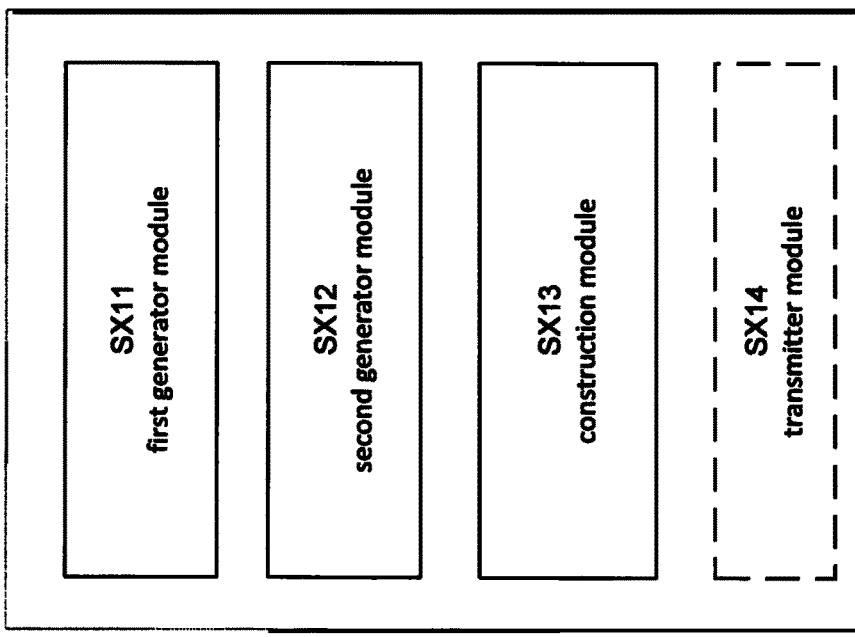
FIG. 18a is a block diagram illustrating aspects of a wireless device.

FIG. 18a shows a wireless device for processing a preamble, the wireless device comprises:
a first generator module SX11 configured to generate one or more identical short sequences s[n], each of the short sequences having a same time duration T as an orthogonal frequency division multiplexing, OFDM, symbol 112 used for carrying data traffic in a radio access network 100 of the wireless device,
a second generator module SX12 configured to generate at least one offset indicator sequence 130a, 130b, 130c, 130d different from each of the short sequences s[n], and
a construction module SX13 configured to construct the preamble sequence 110a, 110b, 110c, 110d by concatenating the at least one offset indicator sequence 130a, 130b, 130c, 130d and the one or more identical short sequences s[n] in time, such that each of the at least one offset indicator sequence has a respective pre-determined location in the preamble sequence 110a, 110b, 110c, 110d, and
an optional transmitter module SX14 configured to transmit the constructed preamble sequence to a preamble receiver 101 in the radio access network 100 of the wireless device 102, 102a.

FIG. 18b shows a preamble receiver for processing a preamble sequence comprising one or more identical short sequences s[n] and at least one offset indicator sequence. The at least one offset indicator sequence is different from each of the short sequences and located at a respective pre-determined location in the preamble sequence. The preamble receiver comprises:
an optional detector module SX21 configured to detect the preamble in the received radio signal based on FFT processing of the received radio signal,
a first determining module SX22 configured to determine a first arrival time component 171 as an arrival time of the preamble sequence up to an unknown integer multiple of a time duration T of the short sequence s[n], based on Fast Fourier Transform, FFT, processing of a received radio signal, wherein a size of the FFT equals a size of an FFT used for detecting an orthogonal frequency-division multiplexing, OFDM, symbol 112 carrying data traffic in a radio access network 100 of the preamble receiver,
a second determining module SX23 configured to determine a second arrival time component 173 as an arrival time of the preamble sequence in terms of an integer multiple of the time duration T of the short sequence s[n], based on the at least one offset indicator sequence, and
an estimator module SX24 configured to estimate an arrival time of the preamble sequence based on a sum of the first 171 and the second 173 arrival time component.

The invention claimed is:

1. A method in a network node of a network, the method comprising:
a preamble receiver of the network node receiving via a physical random access channel (PRACH) a radio signal transmitted by a wireless communication device (WCD) seeking random access to the network, the radio signal comprising a random-access preamble sequence, wherein the random-access preamble sequence comprises a plurality of identical short sequences and at least one offset indicator sequence, the at least one offset indicator sequence being different from each of the short sequences and located at a respective pre-determined location in the preamble sequence; and
after receiving the random-access preamble sequence:
(i) determining, by the preamble receiver, a first estimate of the actual arrival time of the preamble sequence based on Fast Fourier Transform (FFT) processing of the received radio signal, wherein a size of the FFT equals a size of an FFT that is used for detecting an orthogonal frequency-division multiplexing (OFDM) symbol carrying data traffic in a radio access network of the preamble receiver;
(ii) determining, by the preamble receiver, an arrival time component based on the at least one offset indicator sequence;
(iii) determining, by the preamble receiver, a final estimate of the actual arrival time of the preamble sequence based on a sum of the first estimate of the actual arrival time of the preamble sequence and the arrival time component; and
(iv) facilitating wireless communication between the WCD and the network node by the network node using the final estimate of the actual arrival time to estimate a timing offset between the network node and the WCD.

2. The method according to claim 1, further comprising detecting the preamble sequence in the received radio signal based on FFT processing of the received radio signal.

3. A computer program product comprising a non-transitory computer readable medium storing computer program code which, when executed in a preamble receiver, causes the preamble receiver to execute a method according to claim 1.

4. The method of claim 1, wherein
determining the arrival time component comprises choosing a value for the arrival time component, which choosing comprises choosing one of: (1) a value of zero as the value for the arrival time component and (2) a value of T as the value for the arrival time component,
T is the time duration of each of the identical short sequences, and
the choice between (1) and (2) is based on a value of a metric and a detection threshold value.

5. The method of claim 4, wherein selecting one of: (1) zero and (2) T as the value for the arrival time component based on the value of the metric and the detection threshold value comprises:
comparing the value of the metric to the detection threshold value;

determining, based on the comparison, whether the value of the metric is less than the detection threshold value; and choosing zero as the value for the arrival time component as a result of determining that the value of the metric is less than the detection threshold value and otherwise selecting T as the value for the arrival time component.

6. A preamble receiving device, the preamble receiving device comprising:

a receiver for receiving, via a physical random access channel (PRACH), a preamble sequence transmitted by a wireless communication device (WCD) seeking random access to a network, wherein the preamble sequence comprises a plurality of identical short sequences and at least one offset indicator sequence, the at least one offset indicator sequence being different from each of the short sequences and having a respective pre-determined location in the preamble sequence, wherein each of the identical short sequences has a time duration of T; and a processing system, comprising a processor, coupled to the receiver, wherein the processing system is configured such that after receiving the preamble sequence, the processing system:

determines a first estimate of the actual arrival time of the preamble sequence based on Fast Fourier Transform (FFT) processing of the plurality of identical short sequences, wherein a size of the FFT equals a size of an FFT that is used for detecting an orthogonal frequency-division multiplexing (OFDM) symbol carrying data traffic in a radio access network of the preamble receiver, determines an arrival time component based on processing of the at least one offset indicator sequence, calculates a final estimate the actual arrival time of the preamble sequence based on a sum of the first estimate of the actual arrival time of the preamble sequence and the arrival time component, and uses the final estimate of the actual arrival time to estimate a timing offset between the preamble receiving device and the WCD.

7. The preamble receiving device according to claim 6, wherein the processing system is configured to determine the first arrival time estimate using a number F of FFT windows arranged sequentially in time over a receiver time span and indexed by a variable f from 0 through F−1, wherein a first offset indicator sequence has zero amplitude and a respective pre-determined location at an end of the preamble sequence, the processing system is arranged to determine a first value of a first metric indicating the presence of a short sequence at an end of said receiver time span by an FFT window having index f=F−1, and the processing system is further arranged to determine the arrival time component by selecting one of: (1) zero and (2) T as the value for the arrival time component based on the value of the first metric and a detection threshold value, wherein the processing system is configured to select zero as the value for the arrival time component when the value of the first metric is lower than the detection threshold value, and the processing system is configured to select T as the value for the arrival time component when the value of the first metric is higher than the detection threshold value.

8. The preamble receiving device according to claim 7, wherein a second offset indicator sequence has zero amplitude and a respective pre-determined location substantially in the middle of the preamble sequence, and the processing system is further arranged to determine the value of the first metric based on FFT processing of an FFT window corresponding to the second location.

9. The preamble receiving device according to claim 7, wherein the processing system is further arranged to determine a value of a second metric indicating the presence of a short sequence at a beginning of the receiver time span by FFT processing of an FFT window having index f=0, wherein the detection threshold is set to equal the value of the second metric.

10. The preamble receiving device according to claim 9, wherein the processing system is further arranged to determine the value of the second metric based on FFT processing of an FFT window after the FFT window corresponding to the second location.

11. The preamble receiving device according to claim 7, wherein, for each value of d from 1 through D, the processing system is arranged to determine a respective metric value indicating a presence of the short sequence at a respective FFT window with an index f=F−d, the preamble sequence offset detector being arranged to determine the arrival time of the preamble sequence based on comparison between the respective metric values determined by the plurality of late arrival detectors with respect to the detection threshold.

12. A network node comprising the preamble receiving device according to claim 6.

* * * * *